(12) United States Patent
Fortino

(10) Patent No.: US 7,207,547 B2
(45) Date of Patent: Apr. 24, 2007

(54) VALVE OPERATING ASSEMBLY AND SYSTEM FOR OPERATING LEVER-OPERATED VALVES

(75) Inventor: Richard D. Fortino, Alma, MI (US)

(73) Assignee: Powell Technologies LLC, St. Louis, MI (US)

( * ) Notice: Subject to any disclaimer, the term of this patent is extended or adjusted under 35 U.S.C. 154(b) by 58 days.

(21) Appl. No.: 10/946,225

(22) Filed: Sep. 21, 2004

(65) Prior Publication Data
US 2005/0062002 A1 Mar. 24, 2005

Related U.S. Application Data

(60) Provisional application No. 60/588,534, filed on Jul. 16, 2004, provisional application No. 60/504,914, filed on Sep. 22, 2003, provisional application No. 60/515,407, filed on Oct. 29, 2003.

(51) Int. Cl.
*F16K 51/00* (2006.01)
(52) U.S. Cl. .................. 251/144; 251/249.5; 251/292; 137/347
(58) Field of Classification Search ............... 251/144, 251/249.5, 291, 292; 137/347, 348, 350
See application file for complete search history.

(56) References Cited

U.S. PATENT DOCUMENTS

| | | | | |
|---|---|---|---|---|
| 4,280,373 A * | 7/1981 | Denkowski et al. | .......... | 74/625 |
| 4,721,283 A * | 1/1988 | Wilson | ......... | 251/144 |
| 5,134,729 A * | 8/1992 | Shaw | ......... | 137/436 |
| 6,343,615 B1 * | 2/2002 | Miller et al. | .......... | 251/129.12 |
| 6,908,068 B2 * | 6/2005 | Fortino et al. | ............ | 251/292 |
| 6,957,802 B2 * | 10/2005 | Fortino et al. | ............ | 251/291 |

* cited by examiner

*Primary Examiner*—John Bastianelli
(74) *Attorney, Agent, or Firm*—George L. Boller

(57) ABSTRACT

An assembly for swinging an external handle of a tank dome valve on a tank dome about a generally horizontal axis has a gearbox and an air motor. In a preferred embodiment, a housing is cooperatively formed by the gearbox casing and the motor cover. The gearbox contains a worm that meshes with a gear that turns within the casing. The air motor turns the worm, thereby turning the gear. An adapter that is external to the casing has a spline that passes through an aperture in the casing to mesh with an internal spline of the gear. The adapter is shaped for engagement with the handle of the tank dome valve. The housing and adapter are arranged such that, when the adapter is in engagement with the valve handle and the motor is operated to turn the gear via the worm, the far end of the motor cover is forced to bear against the tank dome and consequently force the adapter to swing the handle.

19 Claims, 34 Drawing Sheets

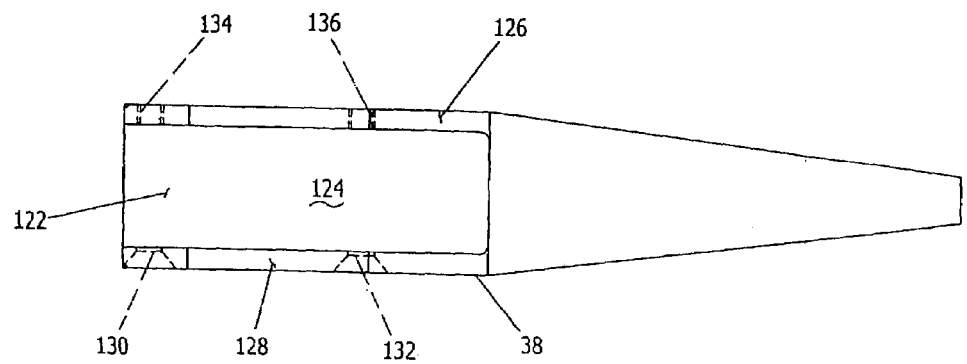
Figure 17
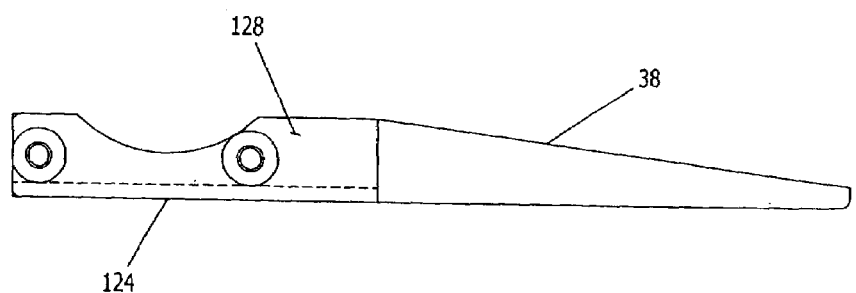
Figure 16
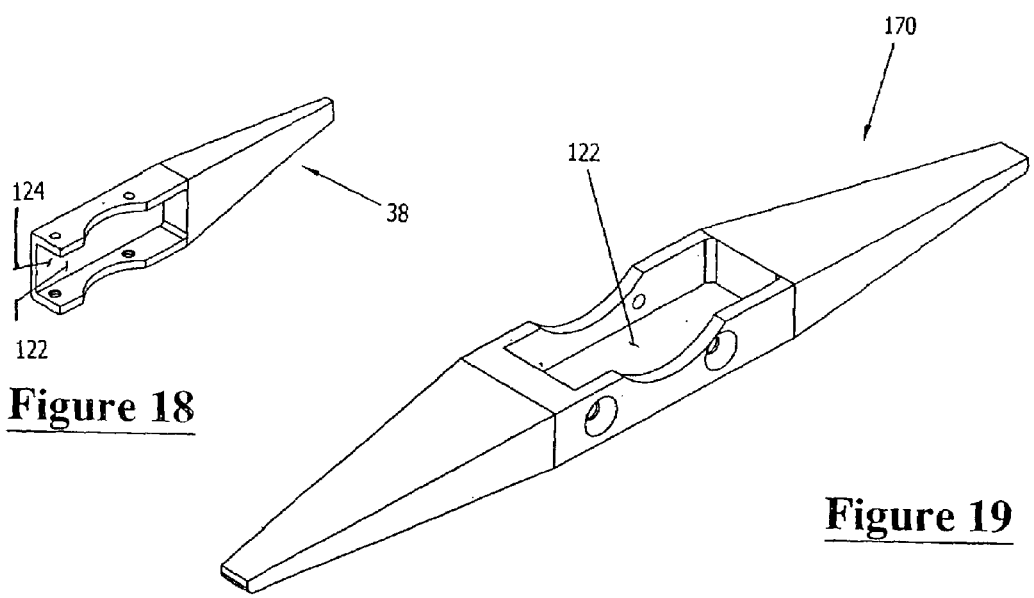
Figure 18
Figure 19

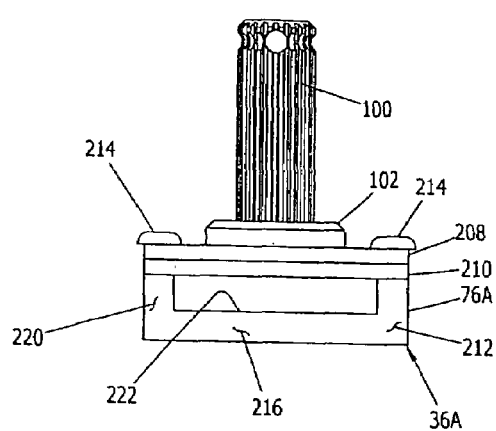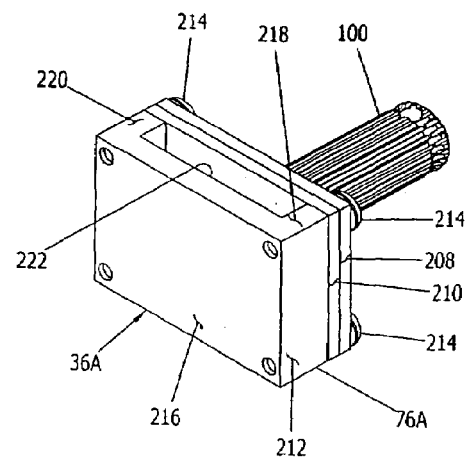
Figure 29  Figure 27
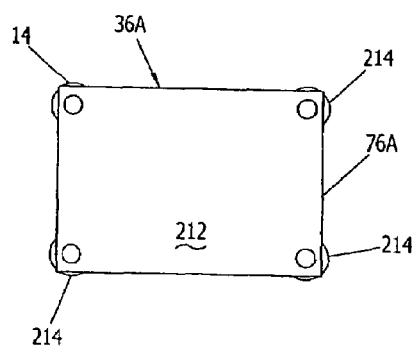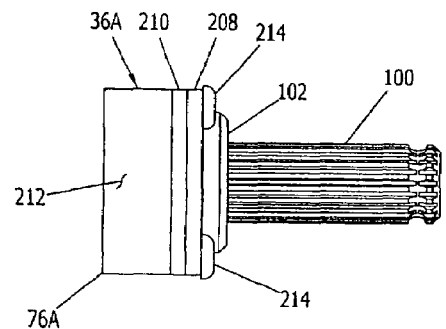
Figure 28  Figure 30

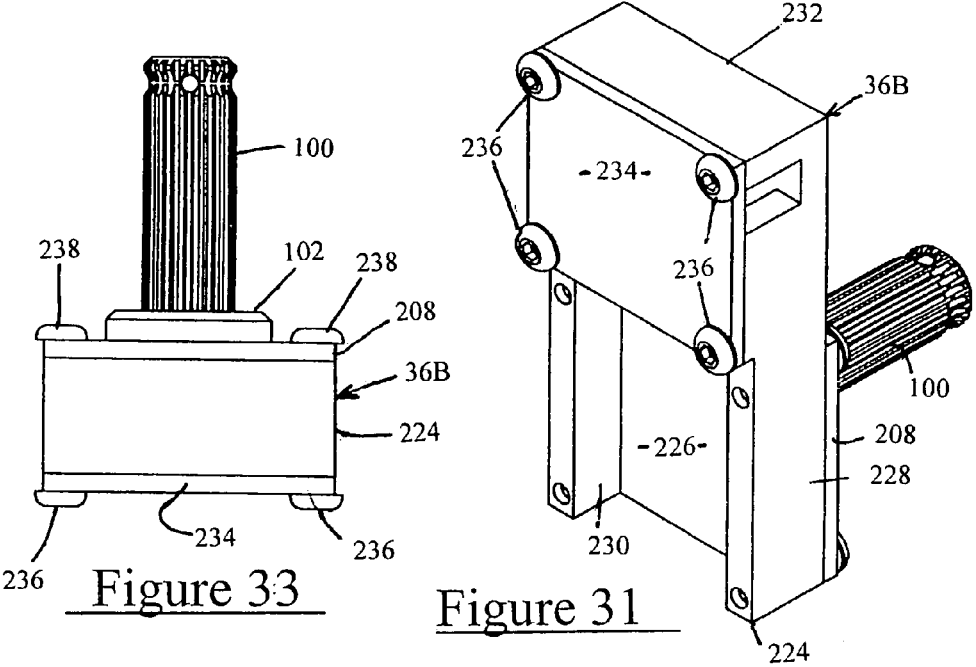
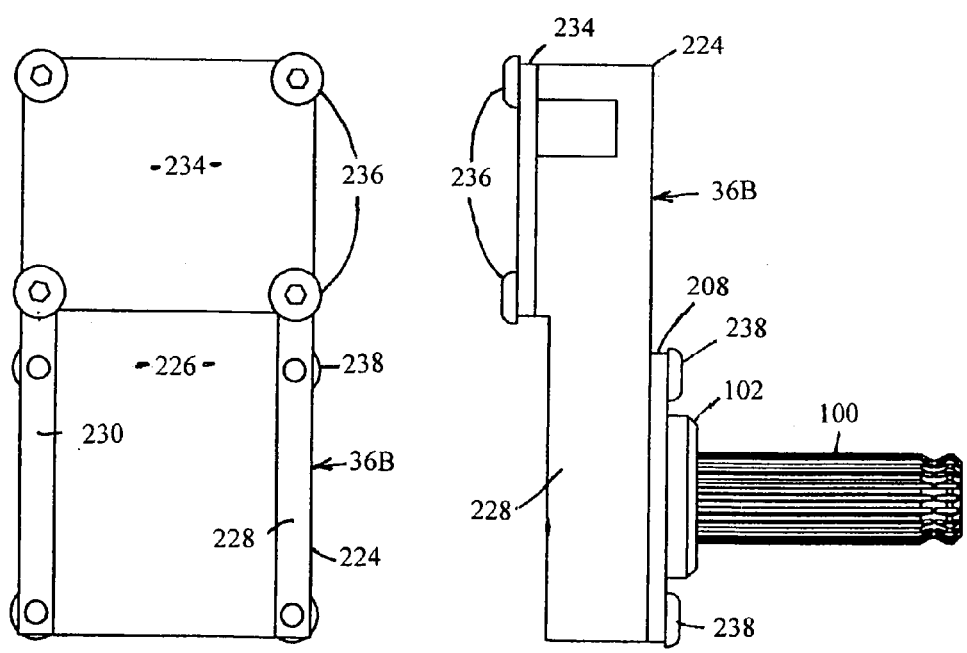
Figure 33
Figure 31
Figure 32
Figure 34

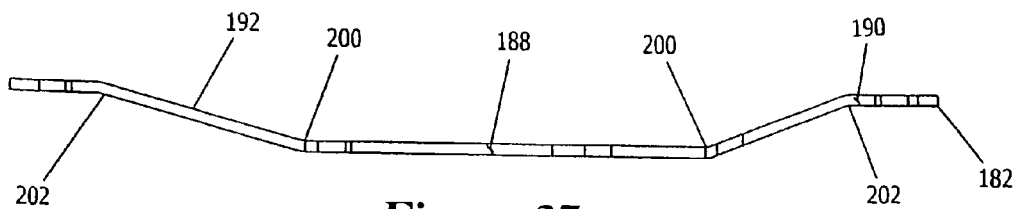
Figure 37
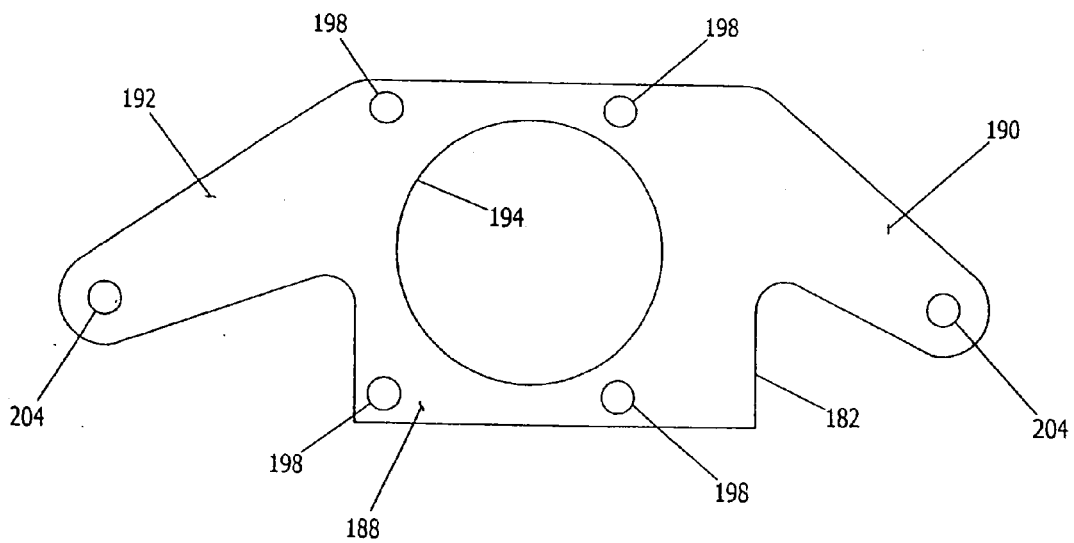
Figure 36
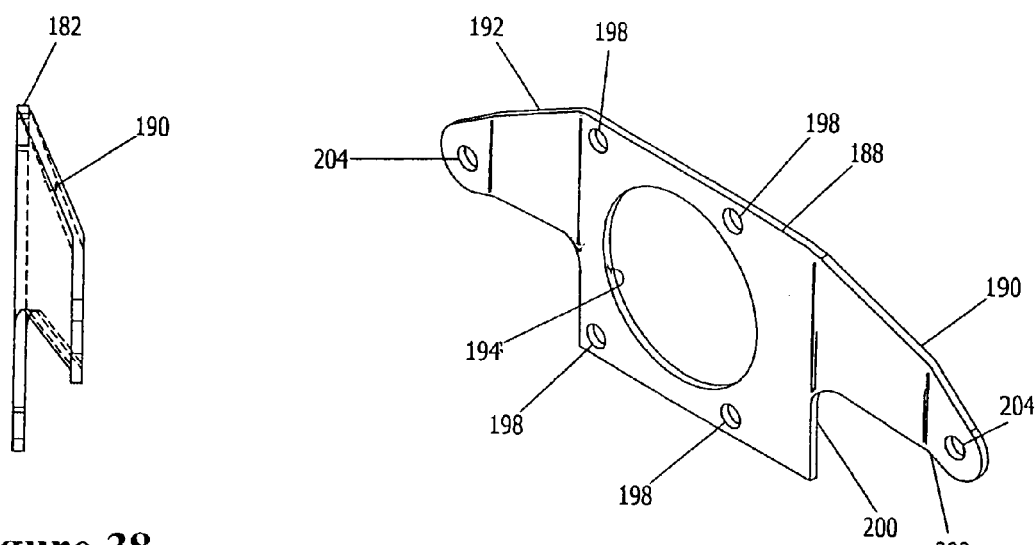
Figure 38
Figure 35

VALVE OPERATING ASSEMBLY AND SYSTEM FOR OPERATING LEVER-OPERATED VALVES

REFERENCE TO RELATED APPLICATIONS AND PRIORITY CLAIMS

This application claims the priorities of patent applications, Provisional Application No. 60/504,914, filed on 22 Sep. 2003, Provisional Application No. 60/515,407, filed on 29 Oct. 2003, and Provisional Application No. 60/588,534, filed on 16 Jul. 2004, all in the name of Richard D. Fortino.

FIELD OF THE INVENTION

This invention relates to a valve operating system and valve operating assembly for operating lever-operated valves, especially valves on railway tank cars having operating levers disposed within a dome on the top of a tank car. One configuration of the operating system and assembly of the invention is particularly adapted for promptly and automatically closing a valve in the event of a leak. Another configuration can open a closed valve, and still another configuration can have a reversing capability for opening a valve when closed and closing the valve when open. The invention also relates to methods of making and using the valve operating assembly.

BACKGROUND OF THE INVENTION

Railway tank cars are one medium for bulk transport of various industrial liquids and gases, including hazardous fluids. Such tank cars have domes where valve operators, such as handles and levers, for various fluid-handling valves are located. The valve operators are external to the tank and housed within a protective housing that has a hinged lid or cover that when swung opened, or removed entirely depending on the particular dome construction, exposes the valve operators so that personnel can access them. The bodies of the valves themselves may be mounted on the bottom wall of the housing, but in some tank cars, they are mounted elsewhere but still operated by a handle or lever within the housing.

One or more of the valves is opened during certain procedures involving loading and/or unloading of fluid into and/or from the tank. In preparation for such procedures, a valve operating assembly having a power actuator, such as an air motor, is hoisted onto the dome where it is then properly placed to associate a coupling attached to an output shaft of the power actuator, an adapter for example, with a valve operator. Depending on the specific configuration of the valve operating system and assembly, the power actuator can be controlled in one or more of various ways: directly at the dome by attending personnel; remotely from a remote location, either by attending personnel, or automatically; uni-directionally to only close an open valve; uni-directionally to only open a closed valve; bi-directionally to either close an open valve or open a closed valve.

One type of valve operator comprises a handle that is turned about a vertical axis to open and close the valve. Such handles have different geometries, and hence unique adapters that removably attach to the power actuator output shaft may be required for particular valve handles. The axis of the output shaft of the power actuator can be coincident with the axis about which the valve operator turns, thereby enabling the adapter alone to interface between them. An example of a valve closure system and assembly for closing valves having such handles is disclosed in commonly owned utility patent application, VALVE CLOSURE SYSTEM AND VALVE CLOSURE ASSEMBLY, application Ser. No. 10/418,693, filed 18 Apr. 2003.

Another type of tank car dome valve is a ball valve whose operator comprises a lever that is swung about a generally horizontal axis to open and close the valve. A typical range of motion for the lever is 90°, and so a valve closure system and assembly for such a valve must be capable of moving the lever over that range of motion with sufficient and appropriate torque throughout the entire range. Some lever-operated ball valves are fully open when the lever is substantially vertical and fully closed when the lever is substantially horizontal. Others are exactly opposite, being fully closed when the lever is substantially vertical and fully open when the lever is substantially horizontal. Still others may be open or closed when their levers are inclined to both horizontal and vertical. The sizes and shapes of the levers may also vary to some extent.

In certain tank cars, the bodies of certain valves may be disposed in locations other than the dome, such as at the bottom of the tank; yet their operators may be located within the protective housing at the dome.

SUMMARY OF THE INVENTION

The present invention relates to further improvements in valve operating systems and assemblies for use with valves of fluid-containing vessels, especially, but necessarily limited to, railway tank cars. The term "fluid" includes both liquids and gases. The invention is particularly directed to a valve operating system and assembly for use on a tank car dome that has a housing within the interior of which a lever of a lever-operated valve is disposed. The lever can swing about a generally horizontal axis over an angular range, approximately 90° is typical, between fully open and fully closed positions.

The valve operating assembly of the present invention may, in certain embodiments, be considered to comprise four principal parts: a motor, a gearbox, a torque arm, and a shoe, or adapter. Briefly, the shoe serves to engage the valve lever; the motor serves to turn the shoe on the gearbox; and the torque arm is fastened to the gearbox casing and arranged for engagement with the dome housing at a distance from the valve lever to enable the assembly to turn the valve lever as the motor turns the shoe on the gearbox. Once, a dome housing cover has been either swung open on, or completely removed from, a tank car dome, the assembly can be placed on the dome in association with the valve by manipulating the assembly within the dome housing to engage the shoe with the lever. At that time an end of the torque arm that is spaced horizontally from the axis about which the valve lever turns on the valve may or may not be resting on the dome housing, but the torque arm does assume an orientation that, when the motor begins to turn the shoe on the gearbox, will cause that end of the torque arm to be forced against the dome housing. When that happens, the constraint imposed by engagement of the torque arm with the dome housing renders continued turning of the shoe on the gearbox effective to turn the valve lever.

When the assembly is turning the valve lever, the assembly has two kinematic constraints on the dome: 1) a constraint at the valve lever by virtue of the engagement of the shoe with the lever, and 2) a constraint at the bottom wall of the dome housing by virtue of an end of the torque arm bearing against the bottom wall of the dome housing. When operated, the motor will begin to turn the shoe relative to the gearbox, and that relative motion will cause the assembly to turn the valve lever in the following way.

The relative motion will act initially to force the end of the torque arm downward against the dome housing bottom wall substantially at some distance from the axis of the valve lever. That constraint provides a support that allows the assembly to turn the valve lever. That point of support is also in the nature of a pivot point that will accommodate any pivotal motion of the assembly that might tend to occur once the assembly begins to turn the valve lever.

With the torque arm being forced against the housing bottom wall, continued relative motion between the shoe and gearbox begins to turn the valve lever. The torque delivered to the shoe through the gearbox creates a force having a component normal to the lever and spaced radially from the axis about which the lever turns. That component is sufficiently large to impart torque sufficient to begin turning the lever, hence initiating valve operation. The shoe has a geometry that renders any force component normal to the torque-producing component insufficient to disengage the shoe from the lever, yet it allows for some limited sliding motion of the lever within the shoe in that direction if the forces that are active tend to produce such motion. The motor continues to operate until the valve lever has been fully turned.

The disclosed embodiments of the invention can be used to operate a valve lever largely independent of the angular orientation of the lever. This is because the invention endows the valve operating assembly with the capability of angularly relating the shoe on the assembly to accommodate different angular orientations of a lever and then to swing the lever over the angular range of motion needed for operating the valve.

The disclosed embodiments of shoe can also be used with several different shapes and sizes of valve levers. A modified embodiment of shoe can be used if the shape and size of a valve lever is too different.

The invention comprises, in disclosed preferred embodiments, an organization and arrangement that is relatively compact and convenient to use.

The valve operating assembly is placed along side the lever of a lever-operated valve to properly engage the shoe with the lever. The torque arm extends from the gearbox in a direction determined by the particular angular position of the shoe on the gearbox, and the end of the torque arm may or may not be engaging the bottom housing wall. The shoe is at one side face of the gearbox, and the torque arm is poised to provide underlying support for the gearbox on the housing bottom wall so as to enable the assembly to turn the valve lever once the motor operates. The motor is mounted atop the gearbox with the long axis of the motor generally upright on the gearbox, although it may be inclined from vertical depending on the angular position of the shoe on the gearbox. The motor axis is perpendicular to a plane containing the axis about which the shoe turns. Internally, the gearbox comprises a worm meshing with a ring gear. The motor turns the worm, which turns the ring gear with resulting torque amplification. The ring gear has an internal spline that receives a spline shaft on the shoe so that as the worm turns the ring gear, the ring gear turns the shoe.

Several different embodiments of torque arms are disclosed. Each possesses its own distinct capabilities. One embodiment is intended simply to close an open tank valve; others to close an open valve and open a closed valve. In certain embodiments the far end of the torque arm merely bears against the bottom housing wall; in another embodiment, it includes a wheel that allows the end to roll on the housing bottom wall.

Other embodiments of the invention have the motor arranged within a cover that cooperates with the gearbox casing to form a housing for the assembly. When the motor operates to turn the adapter, an end portion of the motor cover opposite the gearbox bears against the tank dome to force the adapter to swing the valve handle.

BRIEF DESCRIPTION OF DRAWINGS

The accompanying drawings; which are incorporated herein and constitute part of this disclosure, illustrate a presently preferred embodiment of the invention, and together with the written description given herein disclose principles of the invention in accordance with a best mode contemplated at this time for carrying out the invention.

FIG. 16 is a rear elevation view of the torque arm by itself.

FIG. 17 is a top view of FIG. 16.

FIG. 18 is a reduced perspective view of the torque arm.

FIG. 19 is a perspective view of a different torque arm.

FIG. 27 is a perspective view of another shoe by itself.

FIG. 28 is a front elevation view of the shoe of FIG. 27.

FIG. 29 is a top view of FIG. 28.

FIG. 30 is a right side view of FIG. 28.

FIG. 31 is a perspective view of still another shoe by itself.

FIG. 32 is a front elevation view of the shoe of FIG. 31.
FIG. 33 is a top view of FIG. 32.
FIG. 34 is a right side view of FIG. 32.
FIG. 35 is perspective view of one part of the torque arm of the embodiment of FIGS. 25 and 26.
FIG. 36 is a front elevation view of the part of FIG. 35.
FIG. 37 is a top view of FIG. 36.
FIG. 38 is a right side view of FIG. 36.

DETAILED DESCRIPTION

Figure 3:
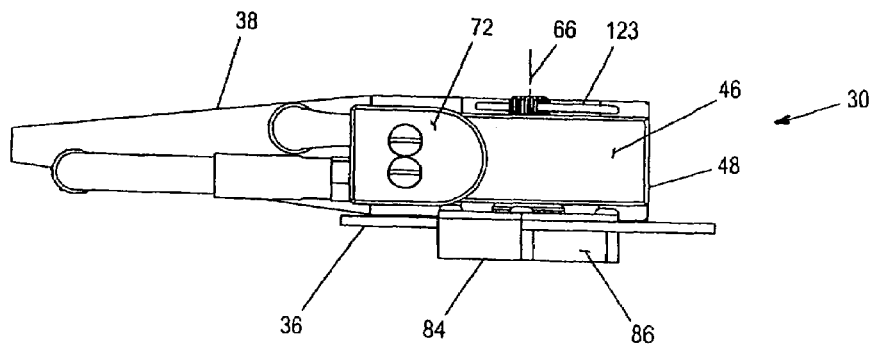
FIG. 3 is a top view of FIG. 1.
Figure 1:
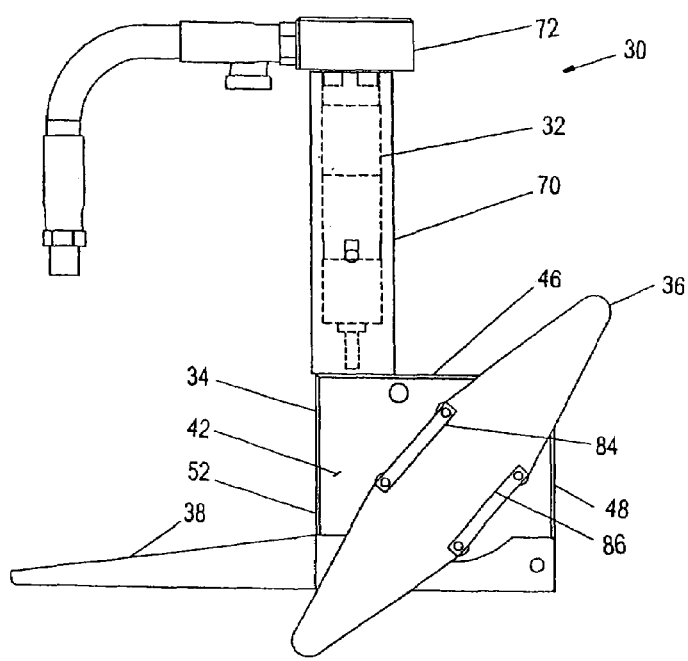
FIG. 1 is a front elevation view showing the general organization and arrangement of a presently preferred embodiment of valve closure system and assembly according to the invention.
Figure 2:
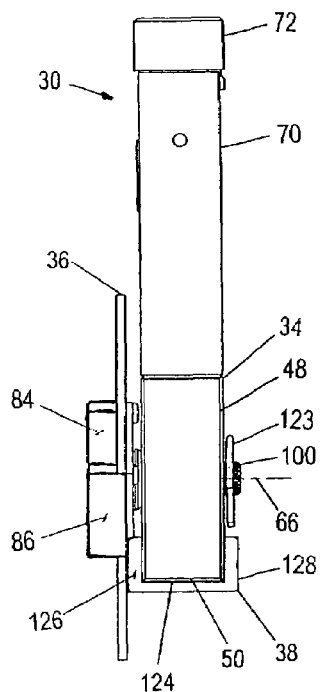
FIG. 2 is a right side elevation view of FIG. 1.
Figure 5:
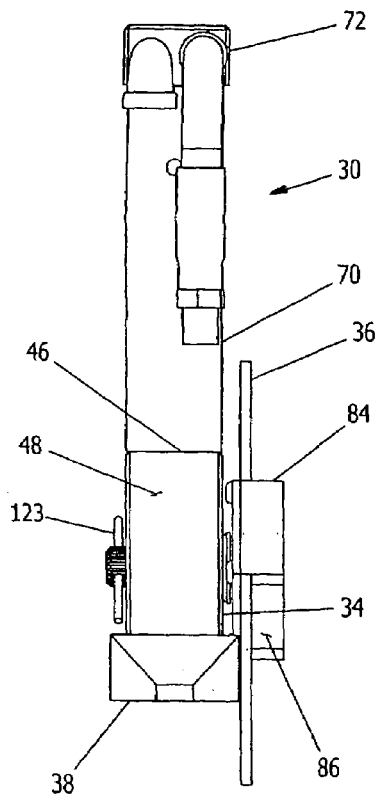
FIG. 5 is left side elevation view of FIG. 1.
Figure 4:
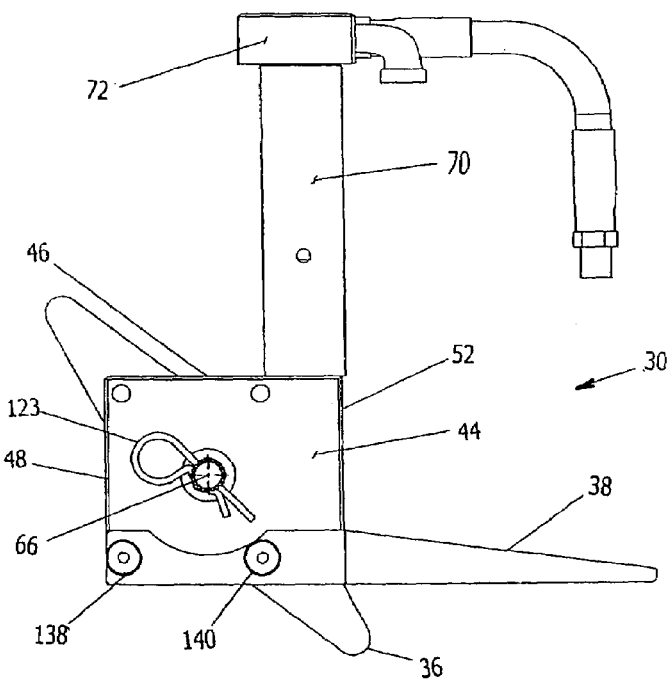
FIG. 4 is a rear elevation view of FIG. 1.
Figure 6:
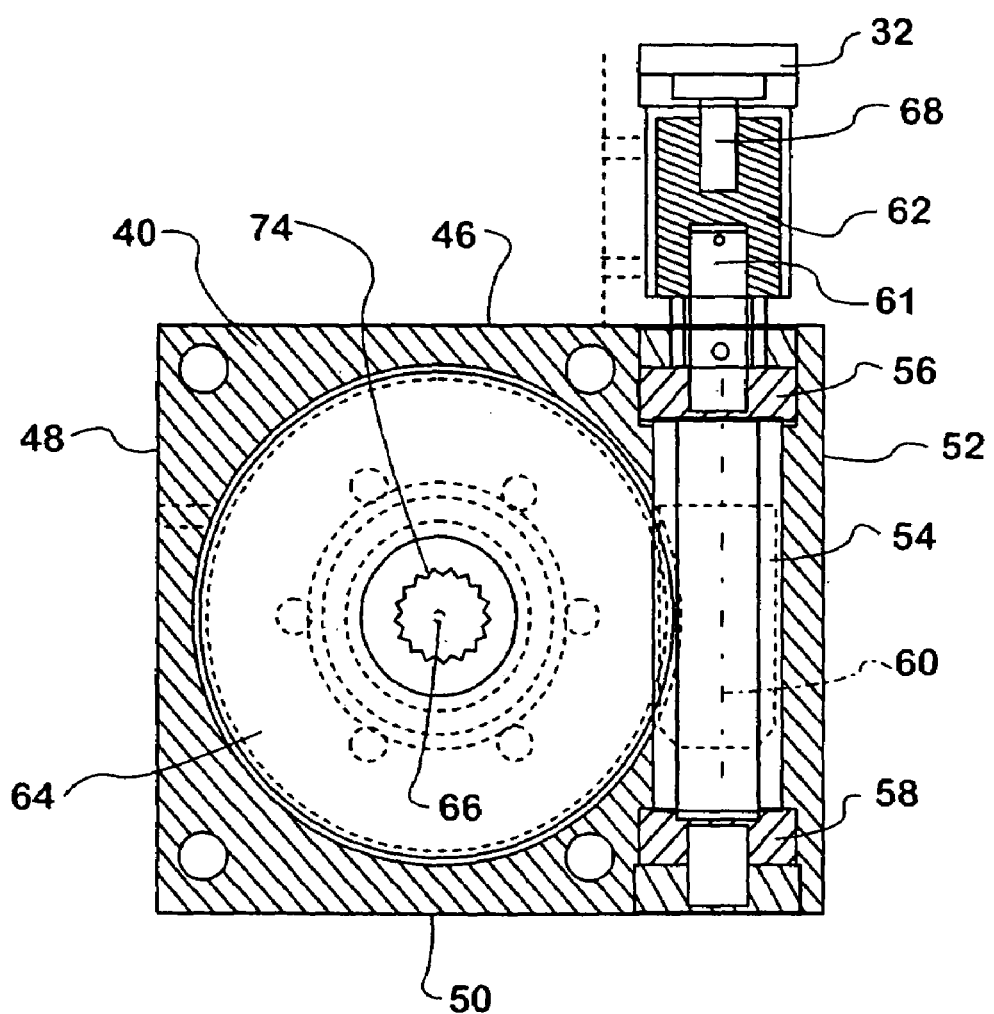
FIG. 6 is an enlarged view in the same direction as FIG. 4 showing the internal construction of the gearbox.
Figure 8:
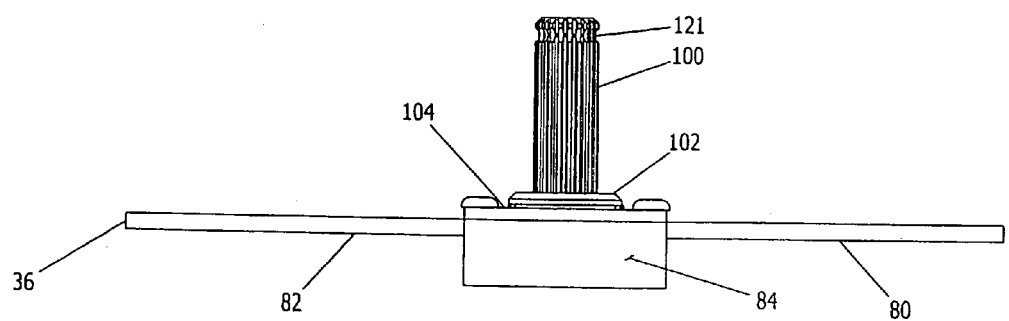
FIG. 8 is a top view of FIG. 7.
Figure 7:
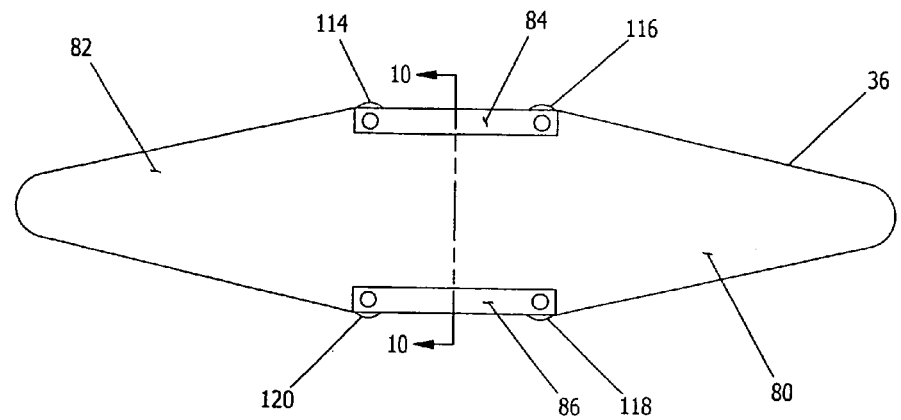
FIG. 7 is a front elevation view of the shoe by itself.
Figure 10:
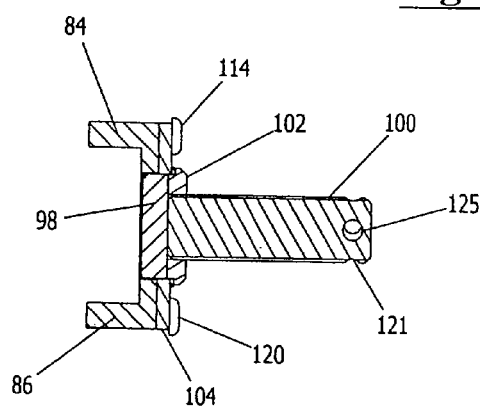
FIG. 10 is a cross section view in the direction of arrows 10—10 in FIG. 7.
Figure 9:
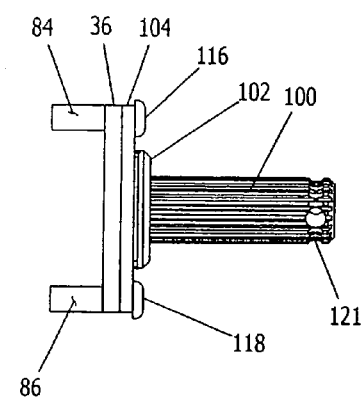
FIG. 9 is a right side elevation view of FIG. 7.
Figure 12:
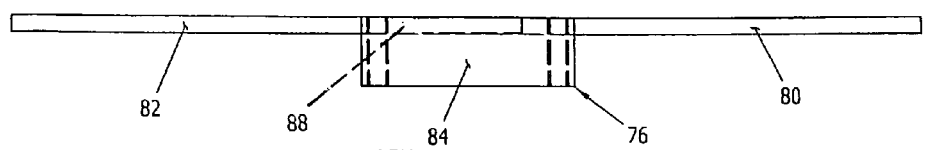
FIG. 12 is a top view of FIG. 11.
Figure 11:
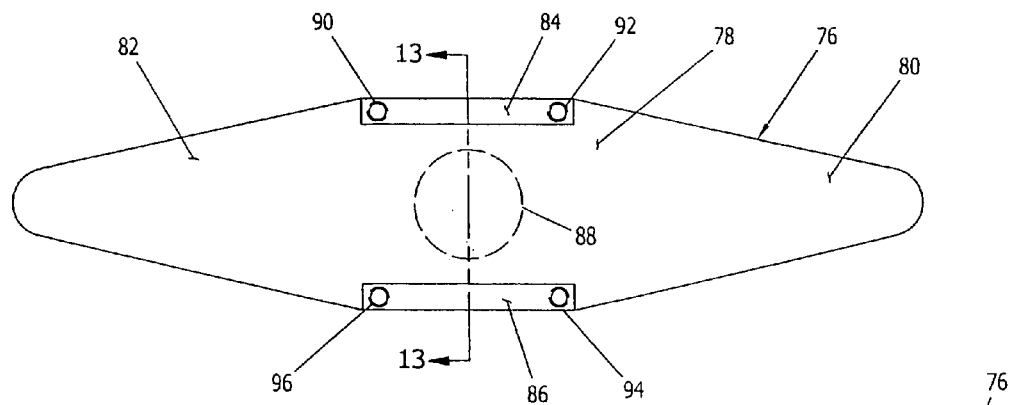
FIG. 11 is a front elevation view of one part of the shoe by itself.
Figure 13:
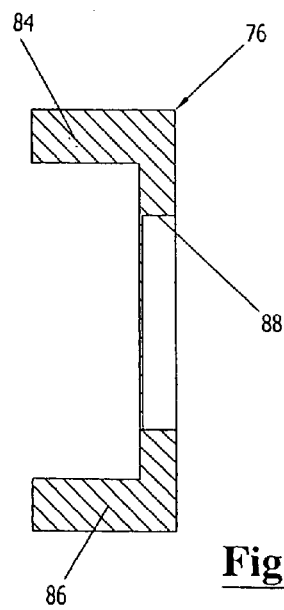
FIG. 13 is an enlarged cross section view in the direction of arrows 13—13 in FIG. 11.
Figure 14:
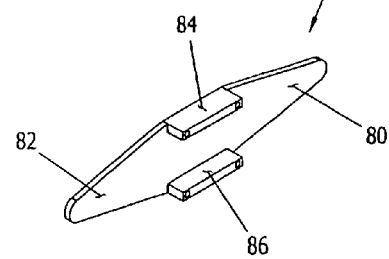
FIG. 14 is a reduced perspective view of the part of FIGS. 11–13 by itself.
Figure 15:
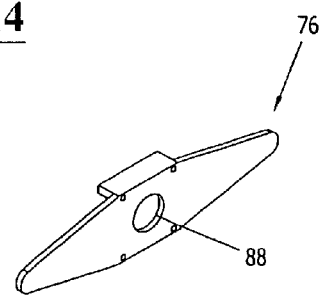
FIG. 15 is another perspective view from a different direction.

FIGS. 1–6 illustrate one embodiment of valve closure assembly 30 according to principles of the invention intended for placement on a tank car dome in operative association with a lever of an external portion of a ball valve housed within the interior of the dome. Assembly 30 comprises an air motor 32, a gearbox 34, a shoe 36, and a torque arm 38.

Gearbox 34 comprises a generally rectangular casing 40 (marked in FIG. 6) having a front vertical face 42, a: rear vertical face 44, and four side faces 46, 48, 50, 52. A worm 54 is disposed internally of casing 40 and journaled on the casing by bearings 56, 58 for rotation about a generally vertical axis 60. An end shaft 61 of worm 54 extends through an opening in face 46 to provide for coupling of the worm to motor 32 via a coupling 62.

A ring gear 64 is also journaled within casing 40 for turning about a generally horizontal axis 66 that is spaced from axis 60 toward side face 48. Worm 54 meshes with ring gear 64 such that as worm 54 turns about axis 60, it turns ring gear 64 about axis 66. The gear ratio multiplies the torque output of motor 32 for use by ring gear 64.

Motor 32 is uprightly supported on gearbox 34 with its long axis coincident with axis 60. Motor 32 comprises an output shaft 68 that coupling 62 couples to worm shaft 61. A cylindrical cover 70 encloses both motor 32 and coupling 62 so that moving parts are not exposed. A manifold 72 is mounted at the top of motor 32 to provide for connection of lines used to supply air to and exhaust air from motor 32 when the motor operates.

Ring gear 64 comprises an internal spline 74 coincident with axis 66. An opening in front face 42 of casing 40 has a diameter greater than that of spline 74 to enable shoe 36 to be coupled to ring gear 64 via spline 74.

Detail of shoe 36 appears in FIGS. 8–15. Shoe 36 is actually an assembly of several individual parts. One part is the shoe frame 76 shown by itself in FIGS. 11–15. It comprises a central hub zone 78 that is essentially square as viewed in FIG. 11 and nominally flat. Arms 80, 82 extend outward in opposite directions from zone 78. The arms are also flat but taper inward as they extend outward from zone 78, finally ending in circularly rounded end edges. Frame 76 further comprises two parallel walls 84, 86 that extend frontally from and perpendicular to zone 78. Each wall 84, 86 runs between arms 80, 82 along the length of a respective one of opposite margins of zone 78. The rear face of shoe frame 76 comprises a circular blind hole 88 at the center of zone 78. Four through-holes 90, 92, 94, 96 extend through frame 76, each through a respective one of the ends of walls 84, 86, as shown.

FIGS. 7–10 show the additional parts of shoe 36. They are a magnet 98, a spline shaft 100, a spline shaft collar 102, and a mounting ring 104. Magnet 98 is a circular permanent magnet that fits snuggly within hole 88. One end of spline shaft 100 fits within and is joined to collar 102. Collar 102 itself fits within and is joined to mounting ring 104 thereby forming a spline shaft assembly consisting of shaft 100, collar 102, and mounting ring 104.

Figure 23:
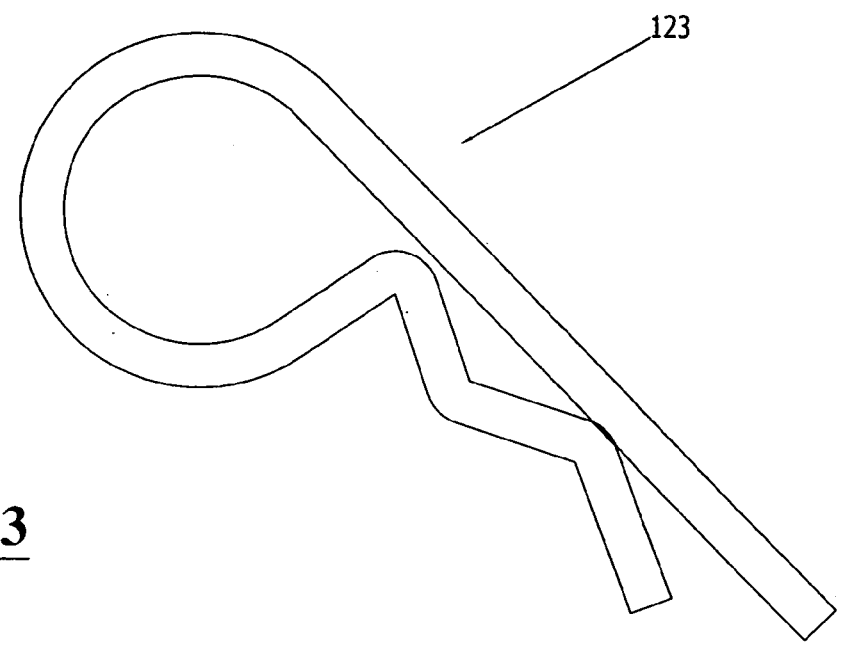
FIGS. 23 and 24 are respective plan and perspective views of a retaining clip for retaining the shoe on the gearbox.
Figure 24:
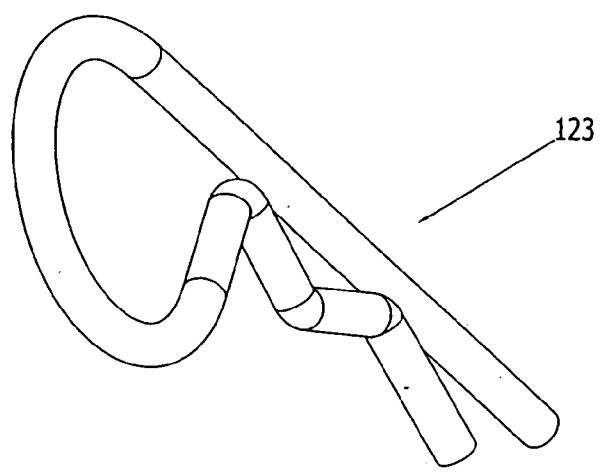

Mounting ring 104 has a front face that is adapted to be disposed flat against the rear face of shoe frame 76 at zone 78. At its four corners, mounting ring 104 has four through-holes [unnumbered] that, when the mounting ring is so disposed, register with holes 90, 92, 94, 96. Screws 114, 116, 118, 120 fasten mounting ring 104 to the rear face of zone 78 of frame 76 via the registered holes. Before the spline shaft assembly is fastened to shoe frame 76, magnet 98 is placed in hole 88 so that the spline shaft assembly captures the magnet upon being fastened to the shoe frame. The spline shaft assembly is assembled to gearbox 34 by inserting the free end of spline shaft 100 through the access opening to internal spline 66 in casing face 42 to engage the spline shaft with the internal spline. The rear casing face also has a clearance hole that allows the free end of spline shaft 100 to protrude through. The shaft has sufficient length to expose a circular groove 121 proximate the shaft end. A diagonal through-hole 125 in the shaft at groove 121 allows a retaining clip 123 to be removably attached to the end of the shaft to capture the shaft on the gearbox. Retaining clip 123 is shown by itself in FIGS. 23 and 24.

FIGS. 16–18 show torque arm 38 comprises a channel 122 running from one lengthwise end far enough to allow the channel to fit snuggly over and onto the lower end of casing 40 as shown in earlier Figures. Channel 122 comprises a bottom wall 124 that is disposed against casing side face 50 and sidewalls 126, 128 that are disposed against lower portions of the front and rear casing faces. Each sidewall comprises a pair of spaced apart holes 130, 132, 134, 136 that when the channel is fit onto the casing, register with through-holes in the casing. Screws 138, 140, pass through holes 130, 132, through the casing through-holes, and are tightened in holes 134, 136 to fasten the torque arm to the casing.

Torque arm 38 extends from channel 122, tapering vertically as shown in FIG. 16. The bottom wall of the torque arm is flat however throughout the full extent of the torque arm. FIG. 17 shows that both sides of the torque arm beyond channel 122 are also tapered.

Figure 20:
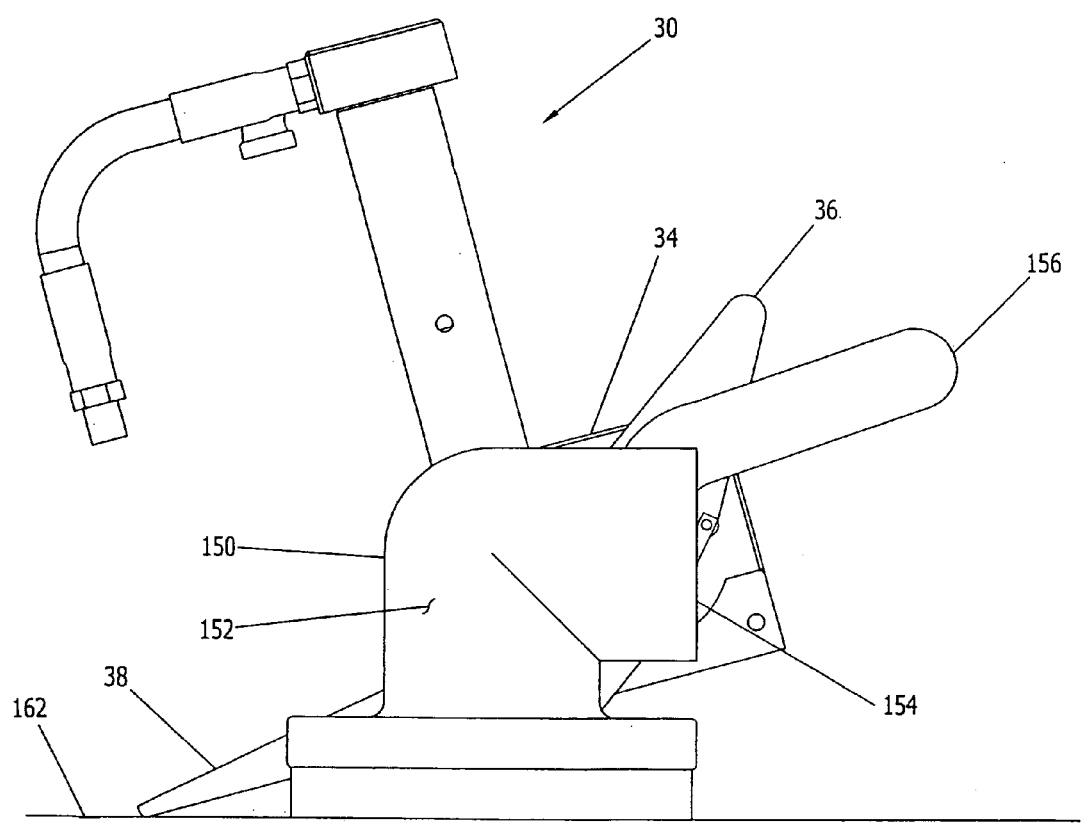
FIG. 20 is a front elevation view of the assembly operating a lever-operated valve with the lever being in a position approximately halfway between fully open and fully closed positions.
Figure 21:
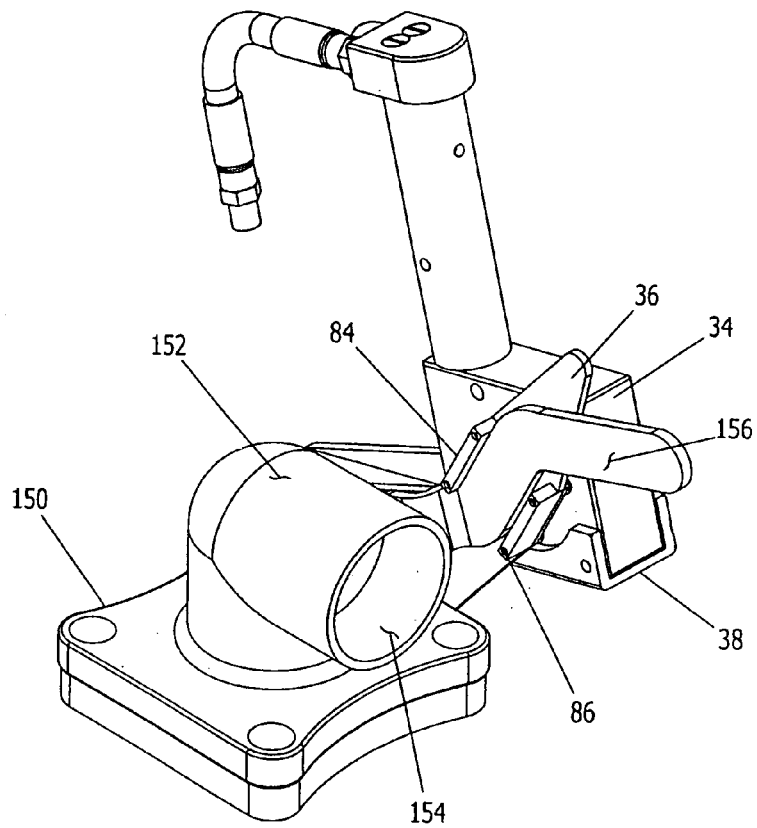
FIG. 21 is a perspective view of FIG. 20 generally from the right front.
Figure 22:
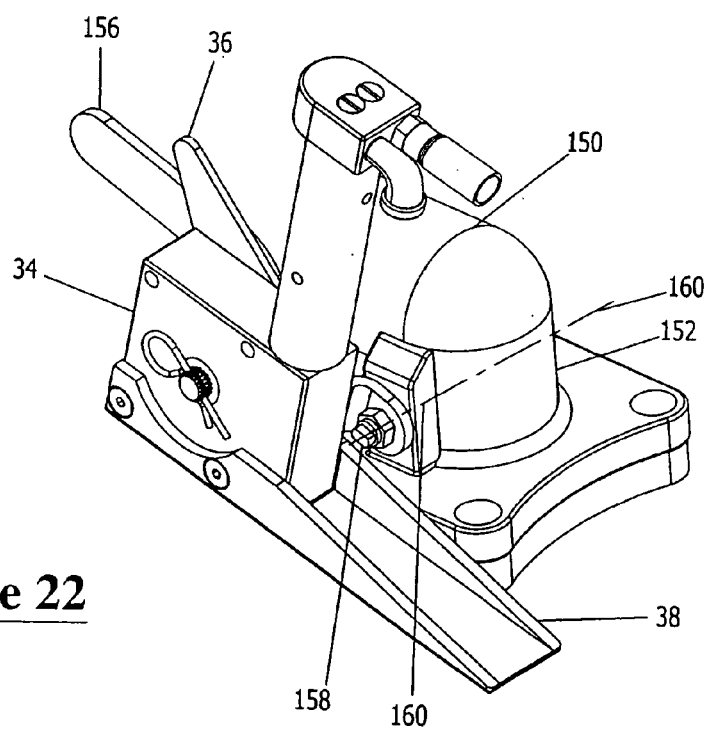
FIG. 22 is a perspective view of FIG. 20 generally from the left rear with the assembly having turned the lever farther from the position shown in FIGS. 20 and 21.

FIGS. 20–22 illustrate an example of how assembly 30 is used with a lever-operated valve 150 mounted on a tank car dome. Valve 150 comprises a housing 152 having an external port 154 that is available for connection with a mating fitting of a conduit (not shown) that is connected to valve 150 during certain procedures related to filling or emptying a tank car. The valve operator comprises a lever 156 disposed to one side of valve housing 152 with one of its ends affixed to the external end of a horizontal shaft 158 that is journaled in a sealed manner on housing 152 for turning about a generally horizontal axis 160. Internal to housing 152 is a ball valve element that turns with shaft 158 within a passage extending from port 46 to the interior of the tank car. Lever 156 can swing about axis 160 over essentially a 90° range of motion. The position shown in FIGS. 20–21 is at about 45° between fully closed position and fully open position.

Assembly 30 is shown placed along side lever 156 with torque arm 38 supporting the assembly on the dome housing bottom wall 162 at some degree of inclination to bottom wall 162. Lever 156 has flat side faces and parallel edges that allow it to fit within shoe 36 as shown. Walls 84, 86 overlie the lever side edges, and one side face of the lever is disposed against zone 78. Magnet 98 provides a holding force on the lever.

When so placed, assembly 30 has two kinematic constraints on the dome: 1) lever 156 by virtue of the engagement of shoe 36 with the lever, and 2) bottom wall 162 by virtue of the end of torque arm 38 bearing against bottom wall 162. When operated, air motor 32 turns the shoe 36 relative to gearbox 34. That relative motion causes assembly 30 to turn lever 156 in the following way.

The relative motion is forcing the end of torque arm 38 downward against wall 162. That constraint provides a support point that allows assembly 30 to turn lever 156. That support point is also in the nature of a pivot point that will accommodate any pivotal motion of assembly 30 that may occur as it begins to turn lever 156.

With torque arm 38 being forced against wall 162, continued relative motion between shoe 36 and gearbox 34 continues to turn lever 156. The torque delivered to shoe 36 through gearbox 34 creates a force having a component normal to lever 156 that is sufficiently large to impart torque sufficient to turn the lever. Shoe 36 has a geometry that renders any force component normal to the torque-producing component insufficient to disengage the shoe from the lever. The shoe construction however does allow the lever to slide lengthwise to a limited extent within the shoe if the forces that are active during operation of assembly 30 tend to induce such motion. Motor 32 continues to operate until lever 156 has been swung to final position.

FIG. 19 shows a different torque arm 170 that has two arms extending in opposite directions from channel 122. The two arms are like the one of torque arm 38, but symmetrically opposite. Torque arm 170 is used in place of torque arm 38 when the assembly has the ability to operate motor 32 bi-directionally so that a valve lever can be operated either from closed to open or from open to closed in accordance with the direction of operation of the motor. When the motor is operated in one direction, the end of one of the two arms will be brought to bear against the housing bottom wall, and when the motor is operated in the opposite direction, the end of the other arm will be brought to bear against the housing bottom wall.

Shoe 36 can be disassembled from gearbox 34 by removing retaining clip 123 and pulling the shoe from the gearbox. The gearbox openings to spline 74 in front and rear casing faces allow the shoe to be assembled to the gear box with the shoe positioned at either front or rear casing face and then secured by installing retaining clip 123. This ability enables an assembly to be re-configured on-site as appropriate to a particular valve mounting.

A non-ferrous metal, such as aluminum or aluminum alloy, is a preferred material for the torque arms.

Figure 25:
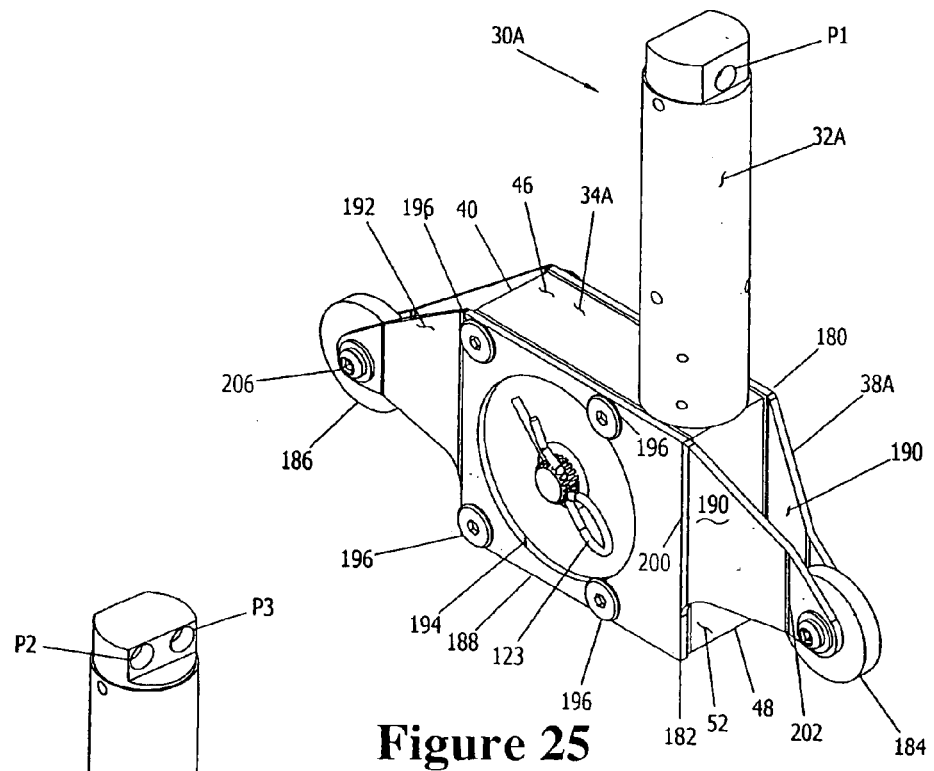
FIG. 25 is a perspective view of another embodiment of valve closure assembly from one direction.
Figure 26:
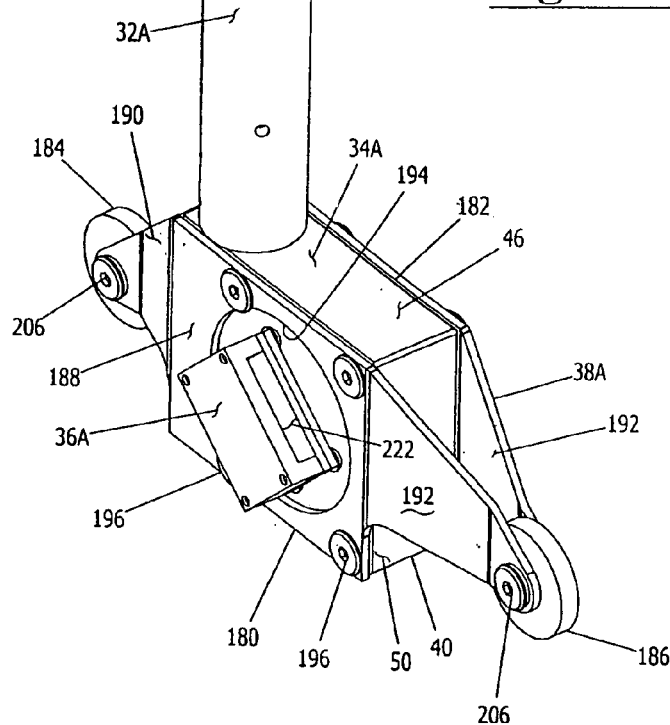
FIG. 26 is a perspective view of the embodiment of FIG. 25 from a generally opposite direction.
Figure 39:
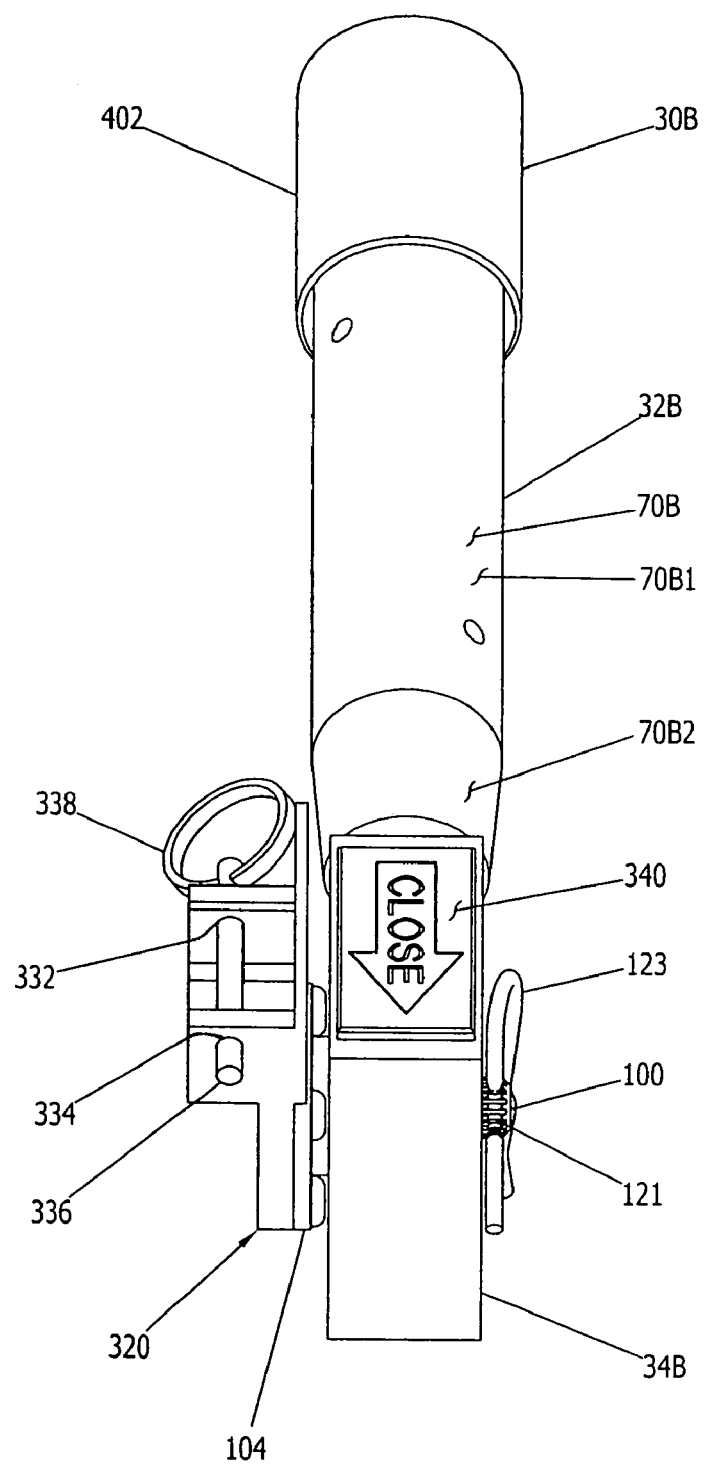
FIG. 39 is a front perspective view looking downwardly of still another embodiment.
Figure 40:
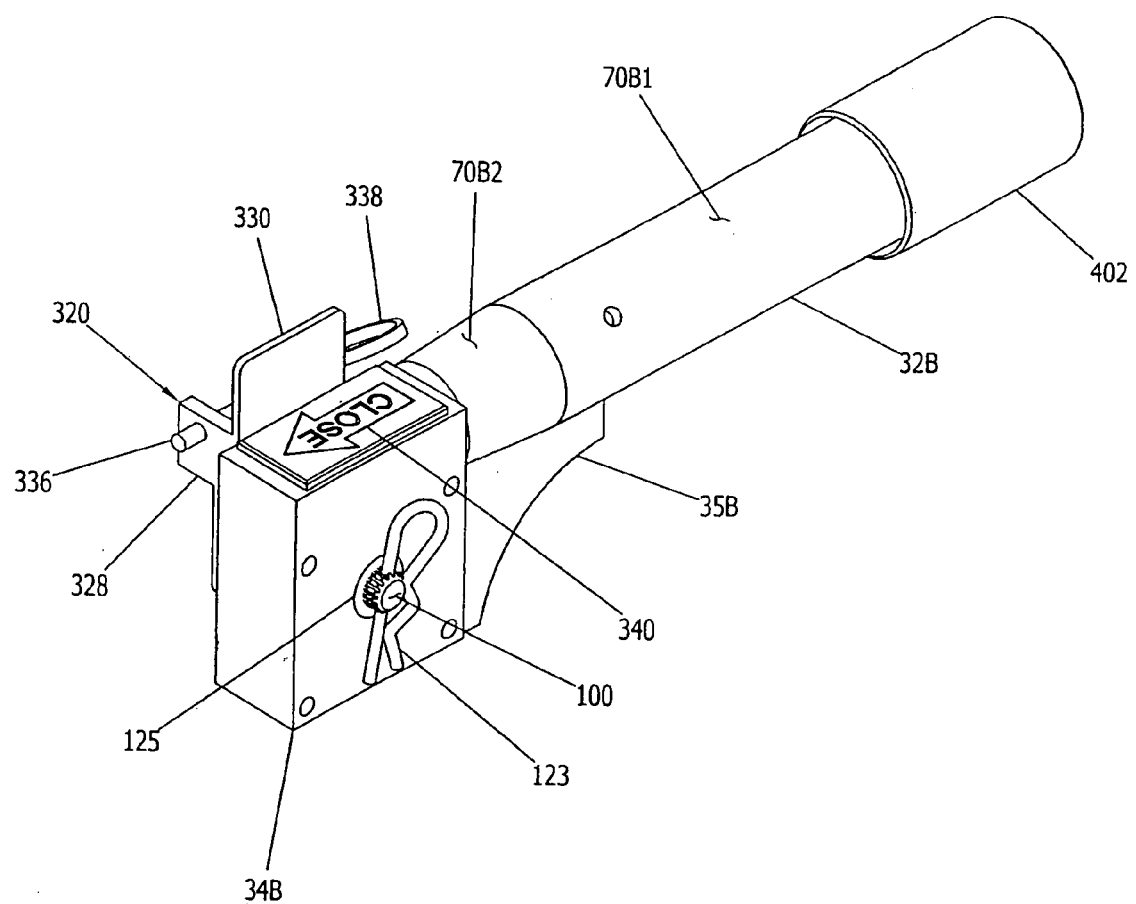
FIG. 40 is a view of FIG. 39 rotated clockwise.
Figure 41:
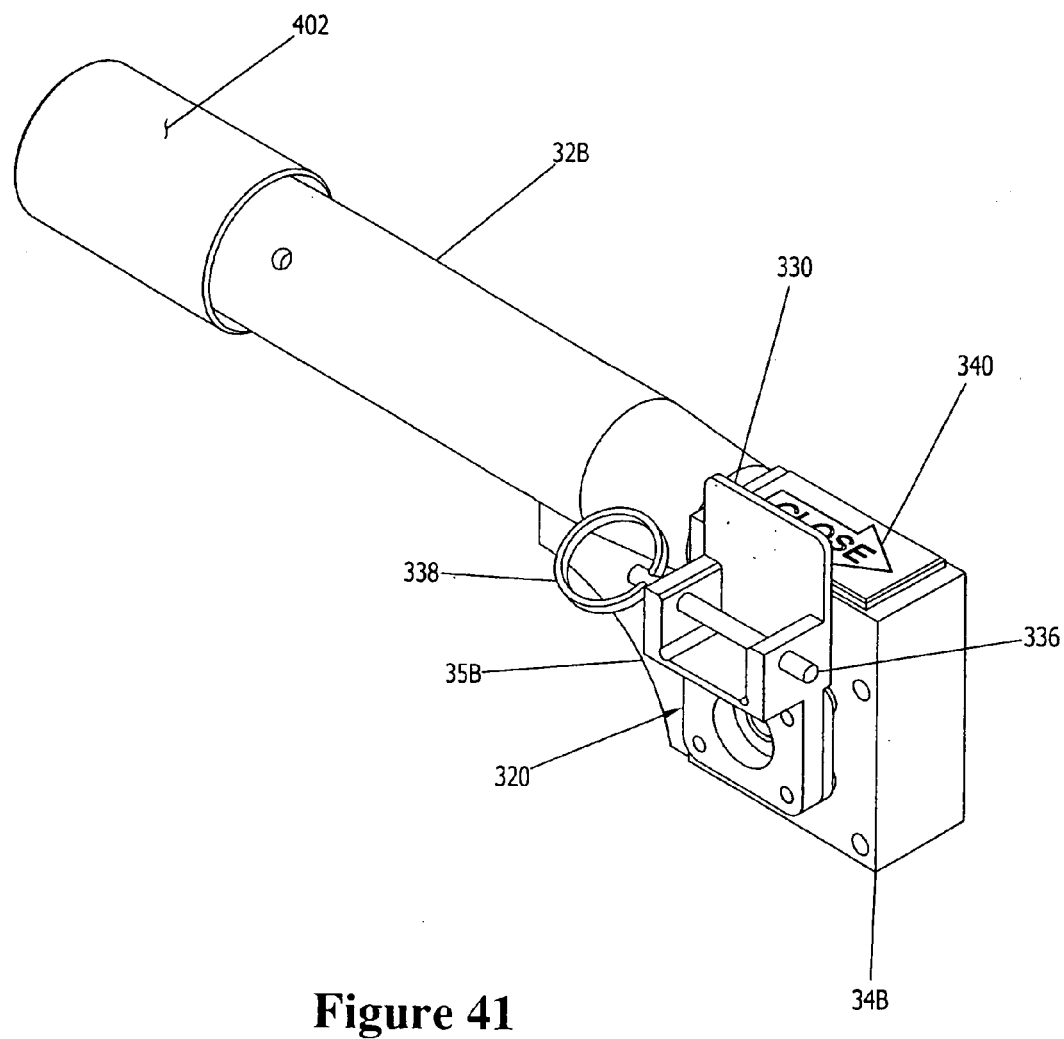
FIG. 41 is a view of FIG. 39 rotated counterclockwise.
Figure 42:
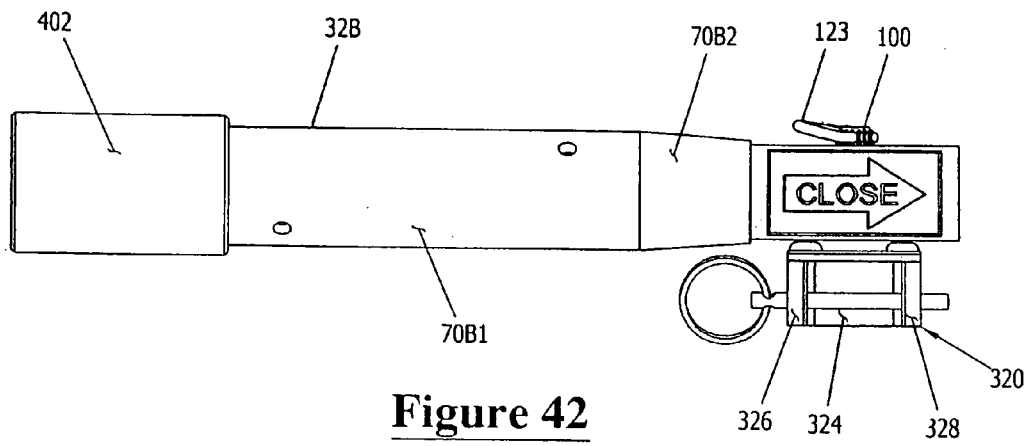
FIG. 42 is a top plan view of the embodiment of FIG. 39.
Figure 43:
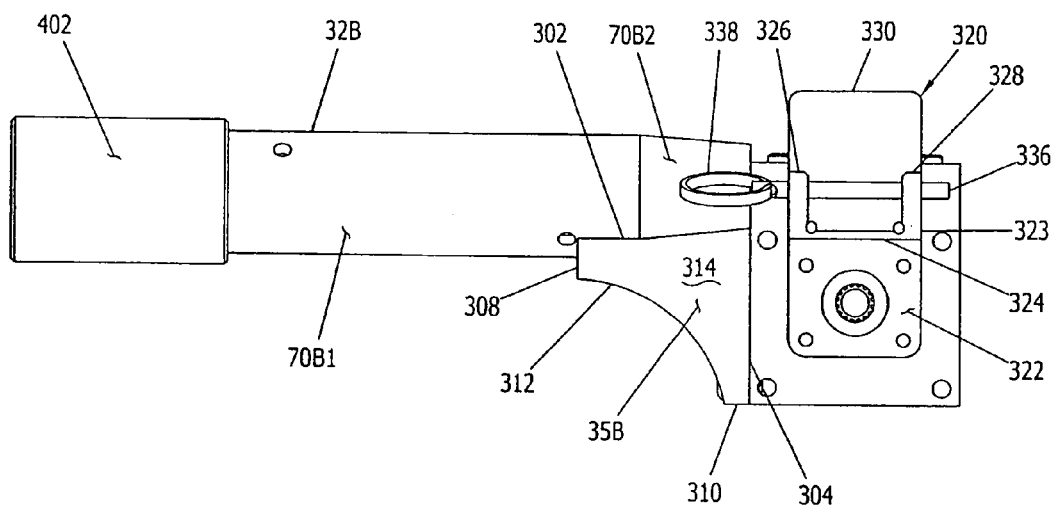
FIG. 43 is a front view of FIG. 42.
Figure 44:
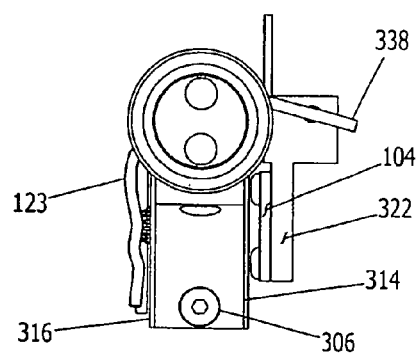
FIG. 44 is a left side view of FIG. 43.
Figure 45:
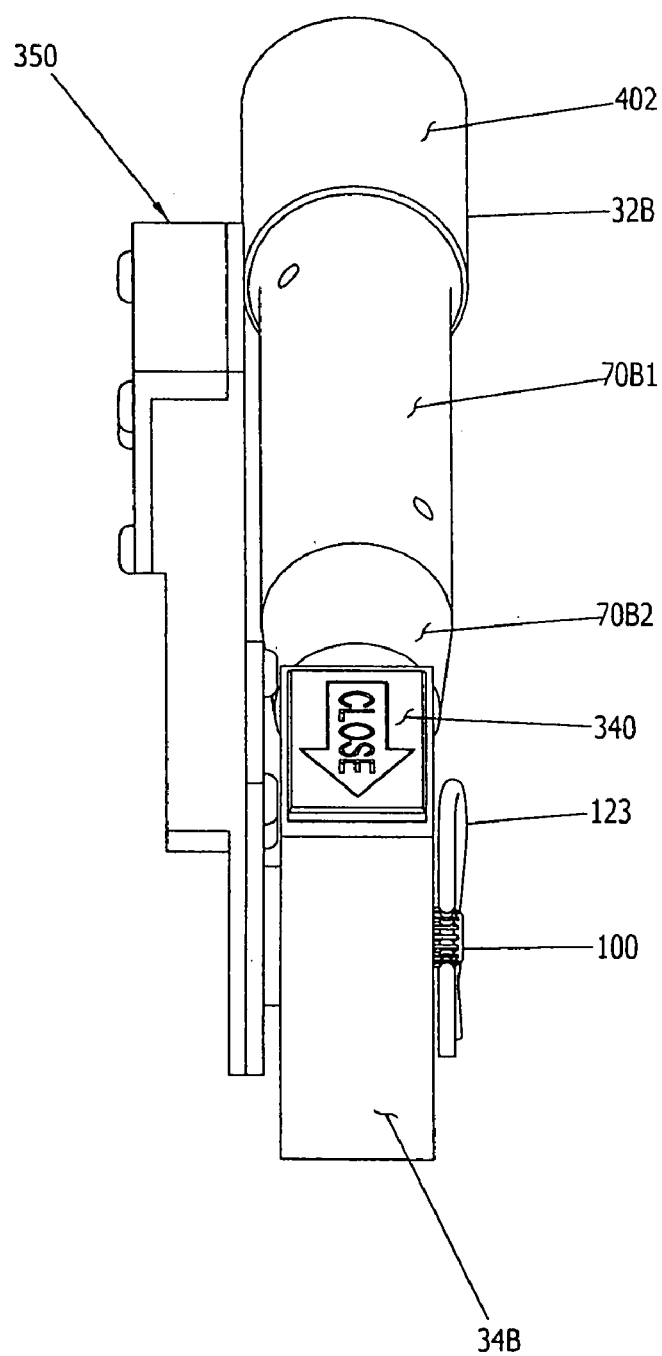
FIG. 45 is a front perspective view looking downwardly of still another embodiment.
Figure 46:
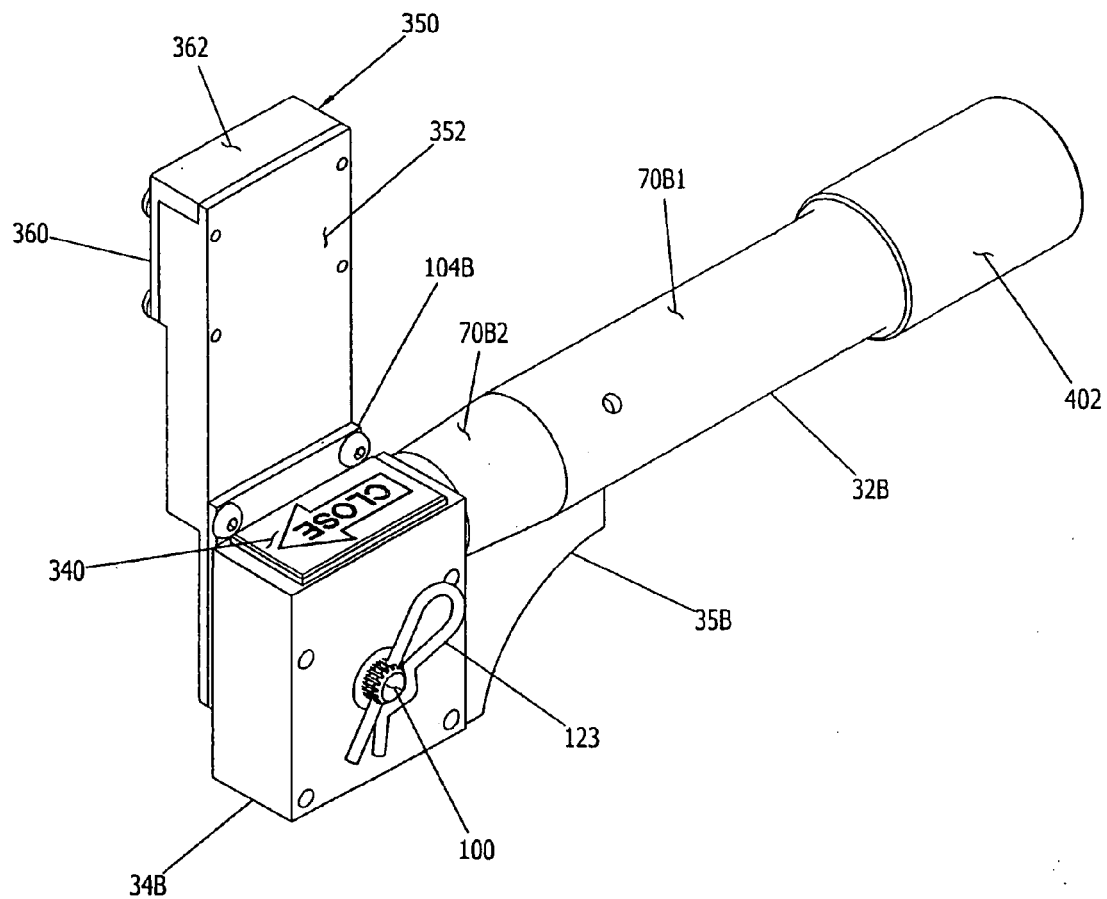
FIG. 46 is a view of FIG. 45 rotated clockwise.
Figure 47:
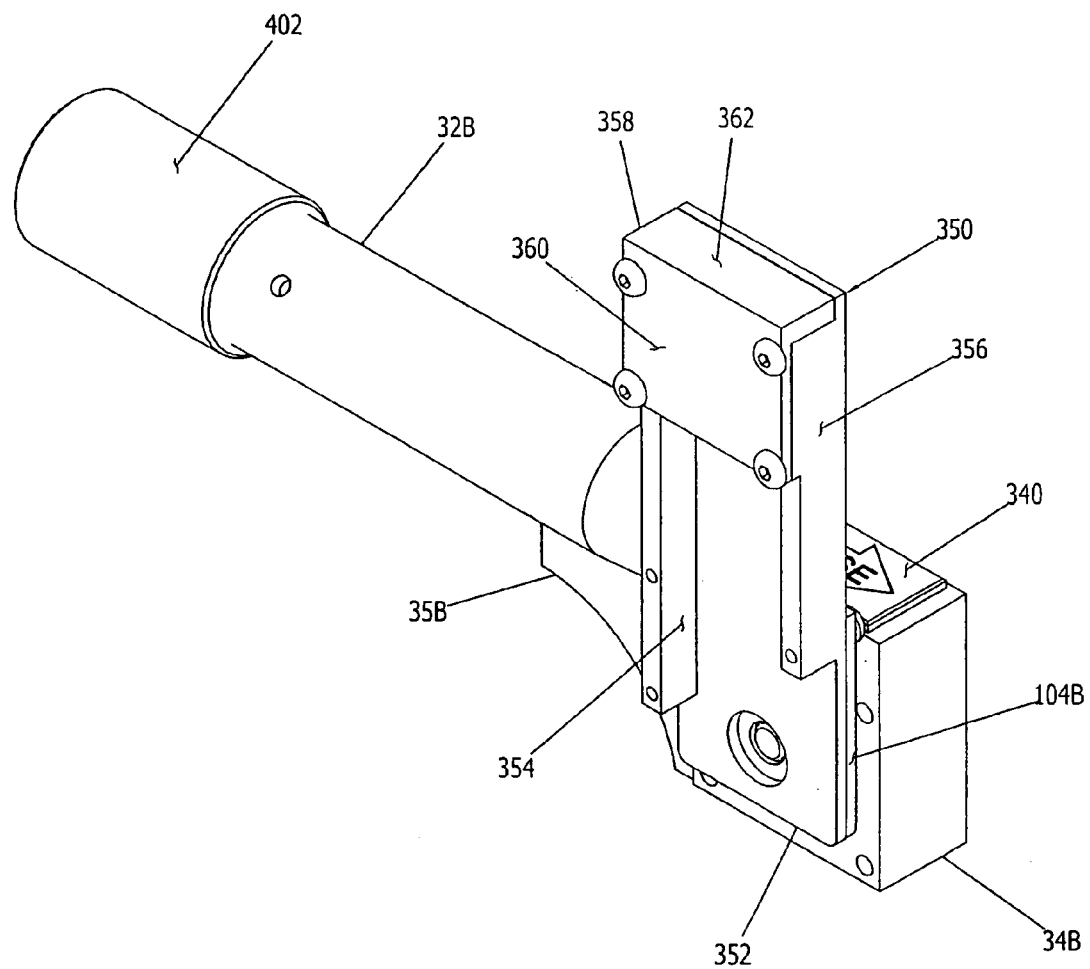
FIG. 47 is a view of FIG. 45 rotated counterclockwise.
Figure 48:
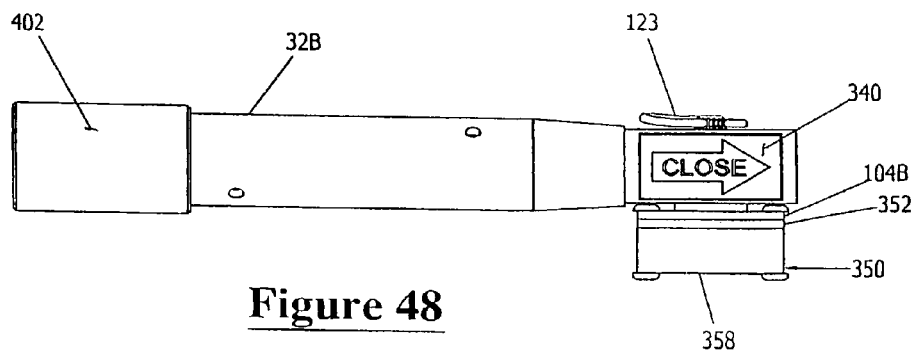
FIG. 48 is a top plan view of the embodiment of FIG. 45.
Figure 49:
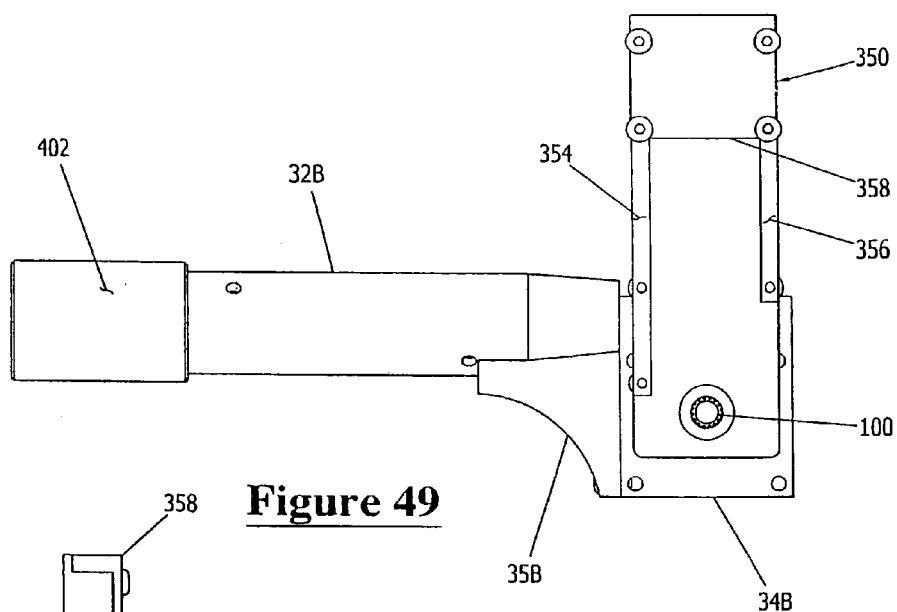
FIG. 49 is a front view of FIG. 48.
Figure 50:
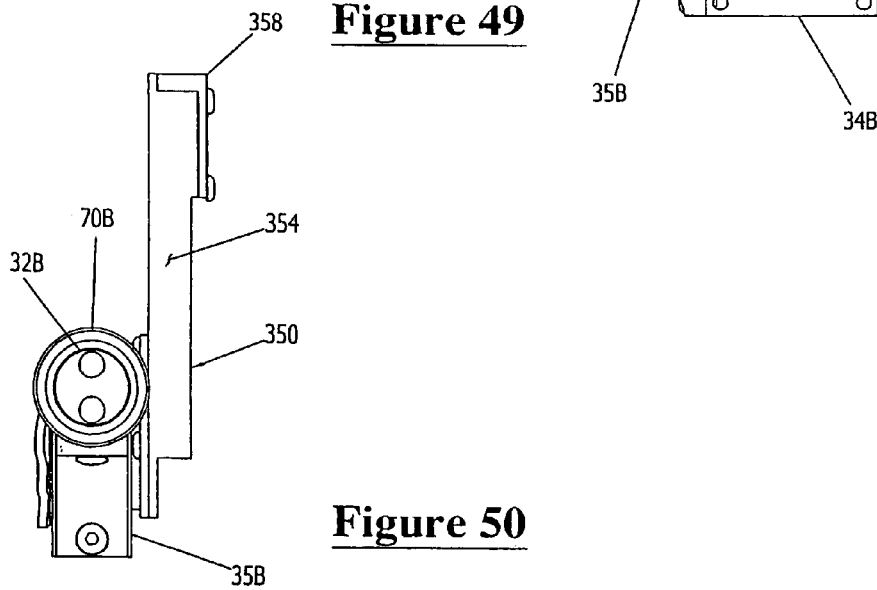
FIG. 50 is a left side view of FIG. 49.
Figure 51:
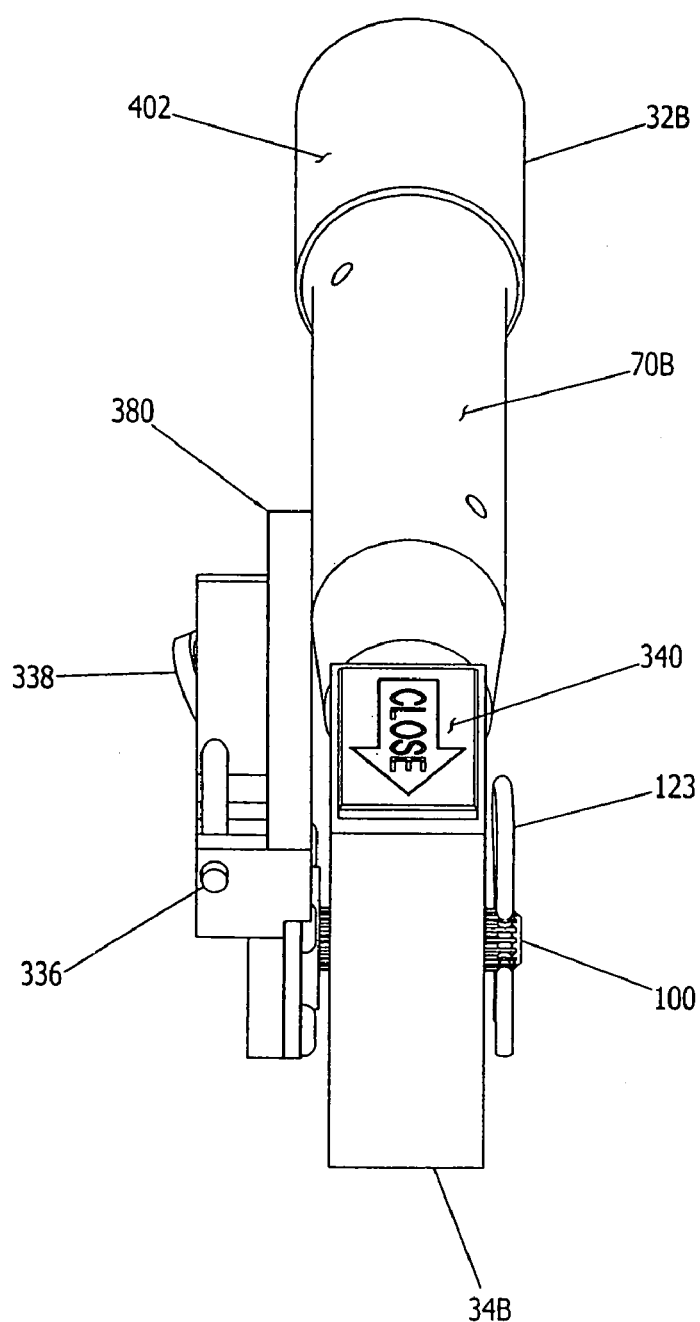
FIG. 51 is a front perspective view looking downwardly of still another embodiment.
Figure 52:
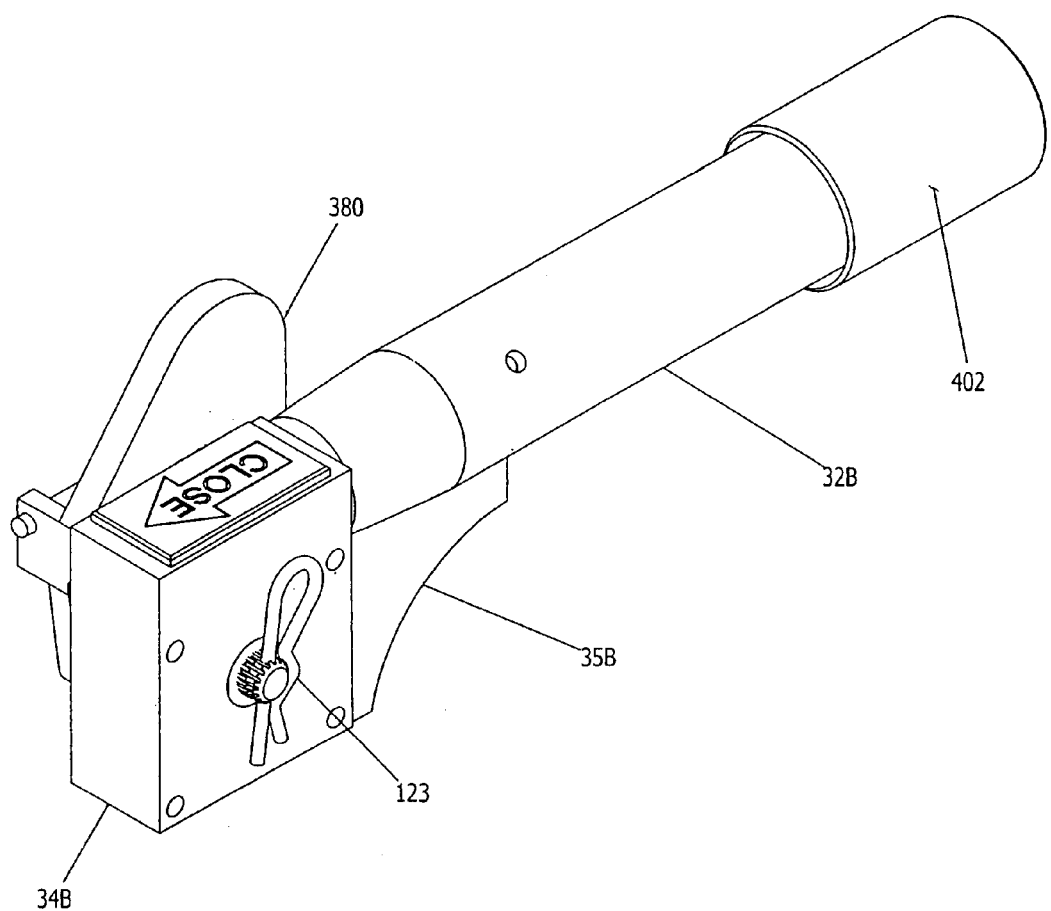
FIG. 52 is a view of FIG. 51 rotated clockwise.
Figure 53:
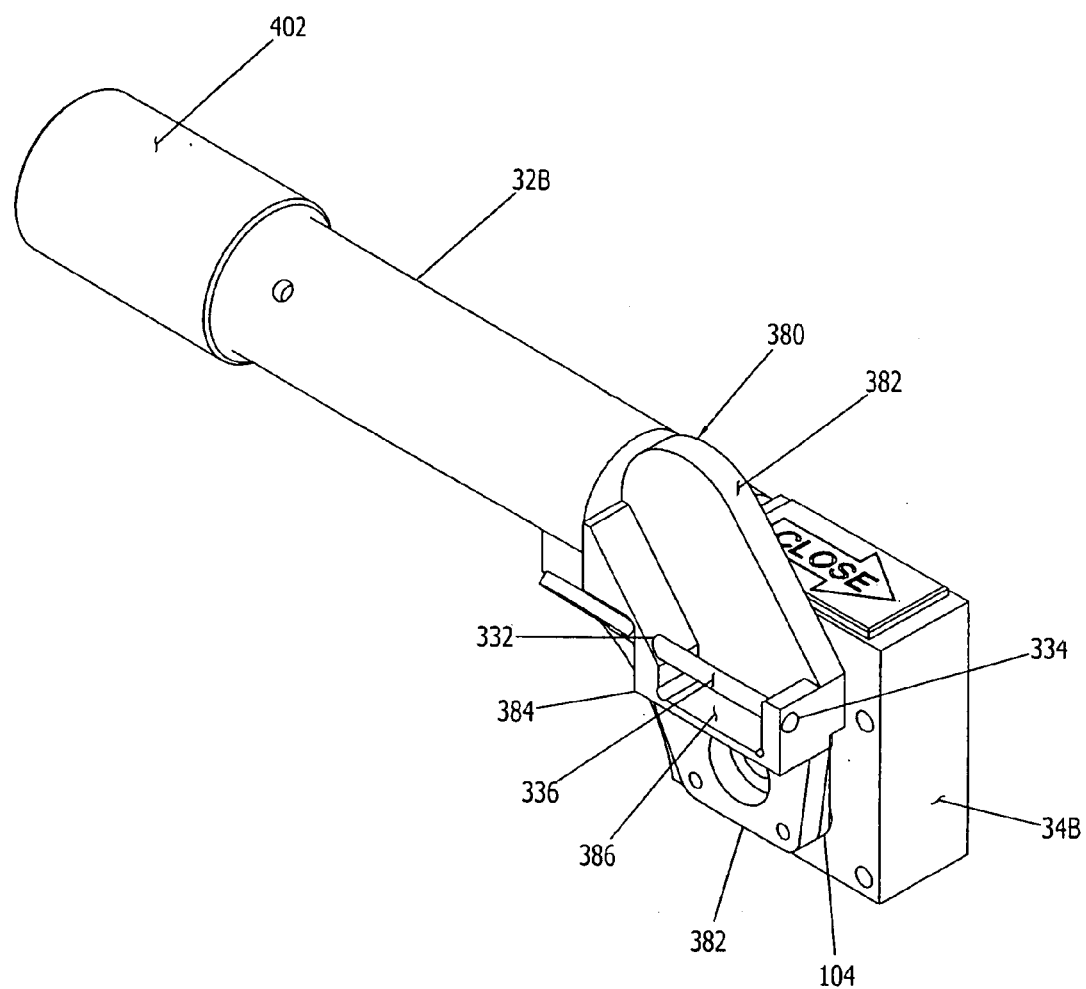
FIG. 53 is a view of FIG. 51 rotated counterclockwise.
Figure 54:
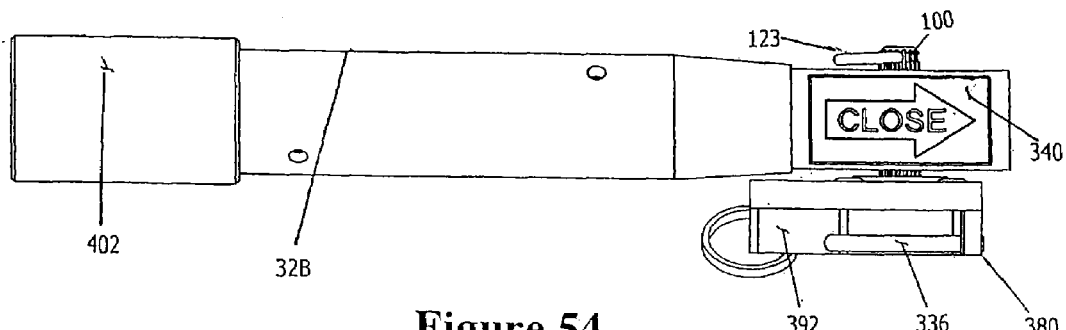
FIG. 54 is a top plan view of the embodiment of FIG. 51.
Figure 55:
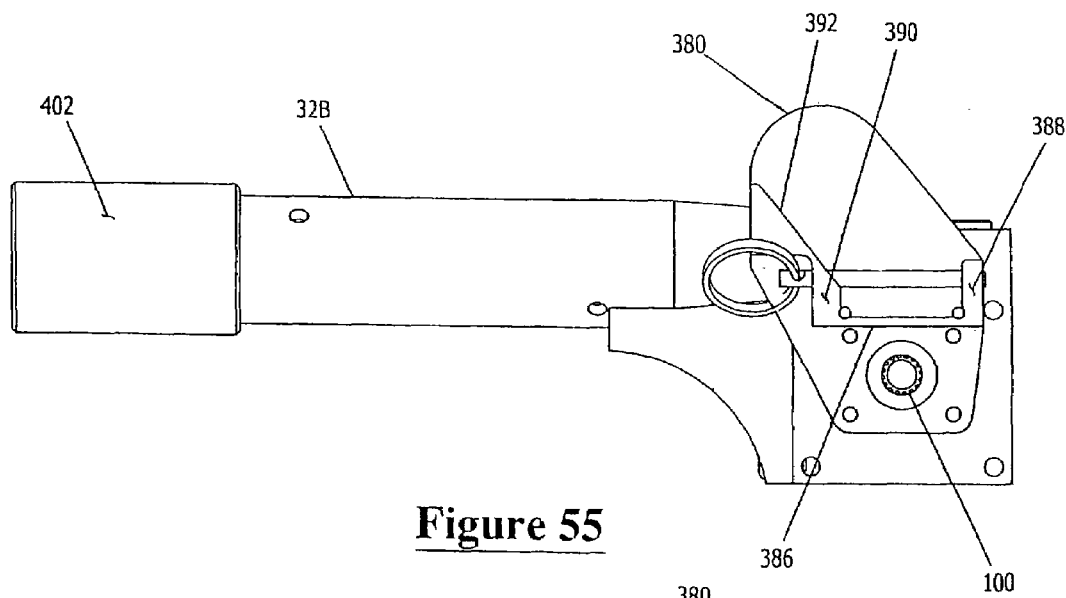
FIG. 55 is a front view of FIG. 54.
Figure 56:
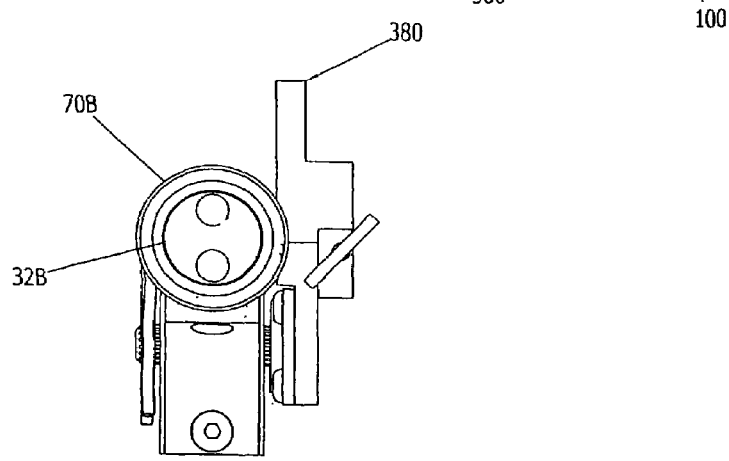
FIG. 56 is a left side view of FIG. 55.
Figure 57:
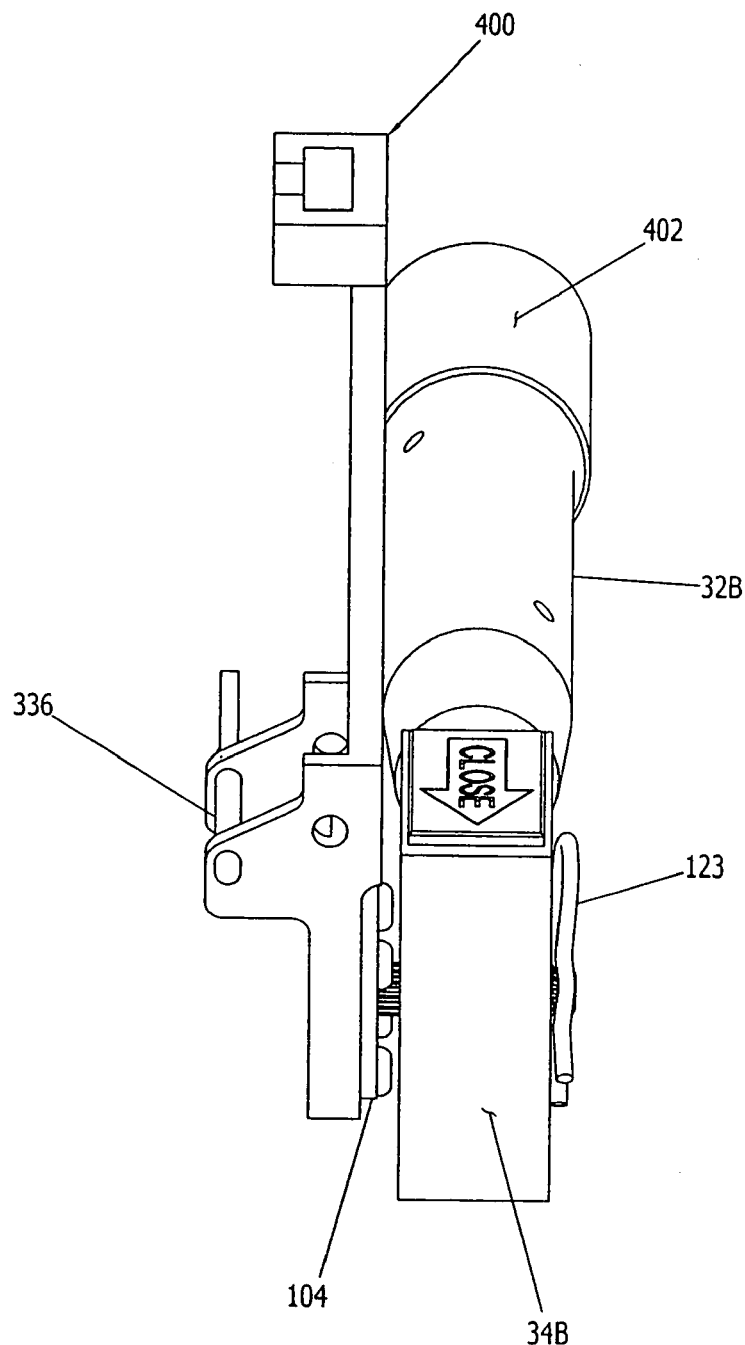
FIG. 57 is a front perspective view looking downwardly of still another embodiment.
Figure 58:
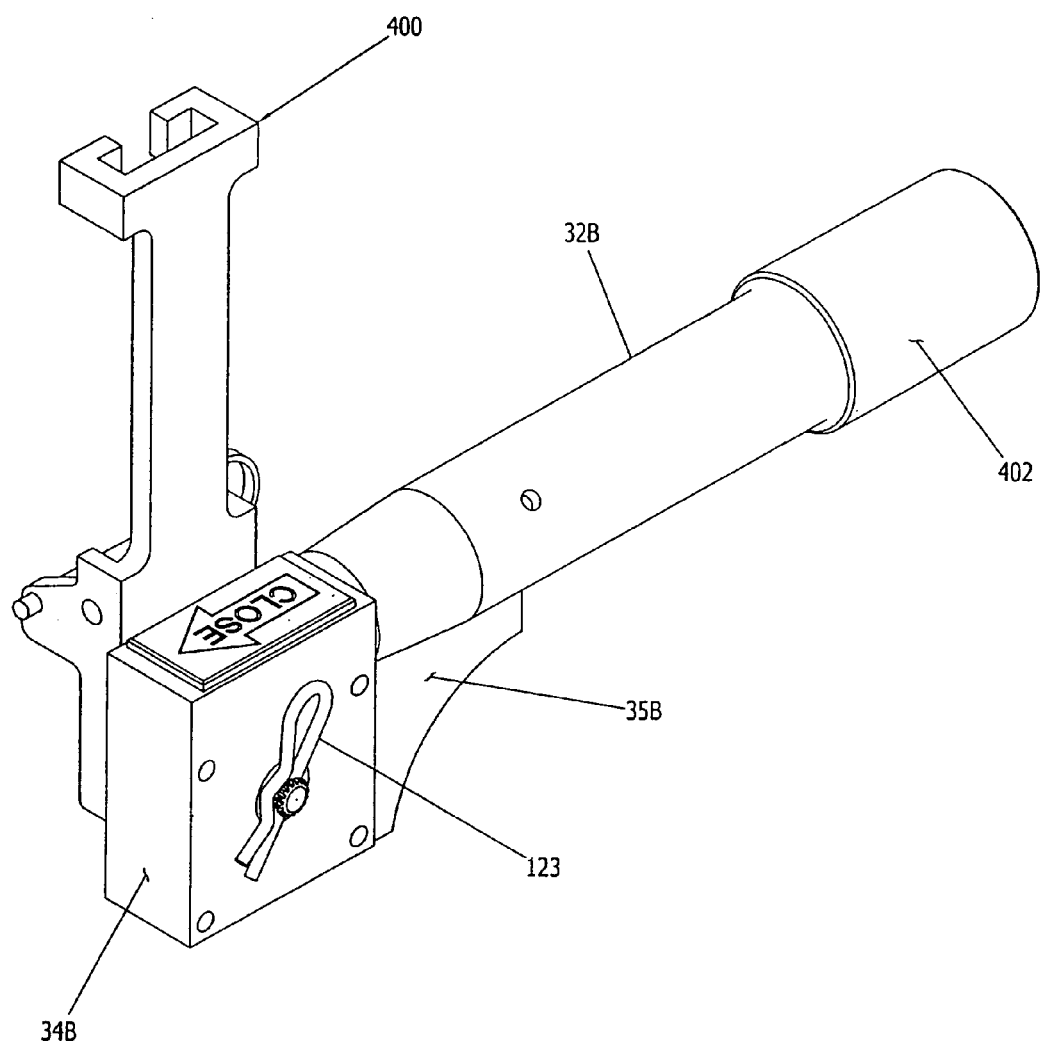
FIG. 58 is a view of FIG. 57 rotated clockwise.
Figure 59:
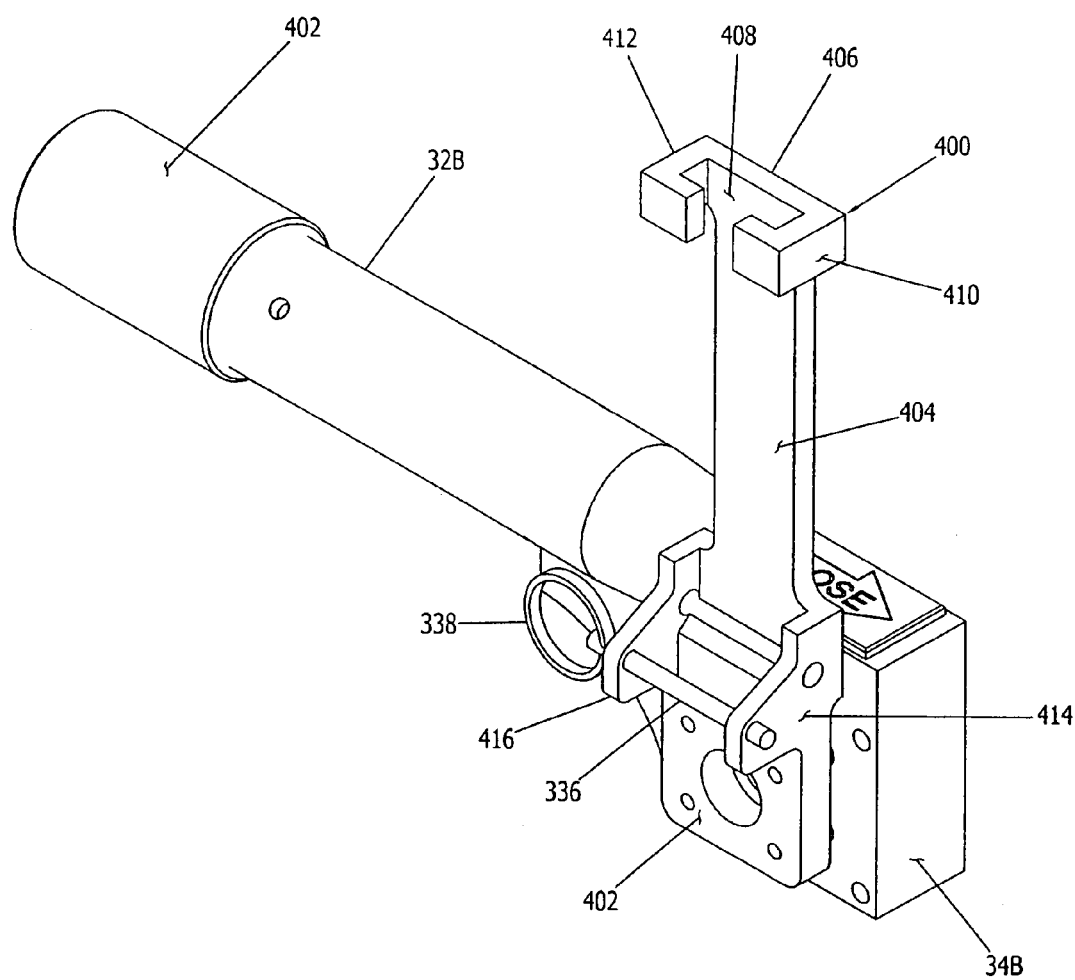
FIG. 59 is a view of FIG. 57 rotated counterclockwise.
Figure 60:
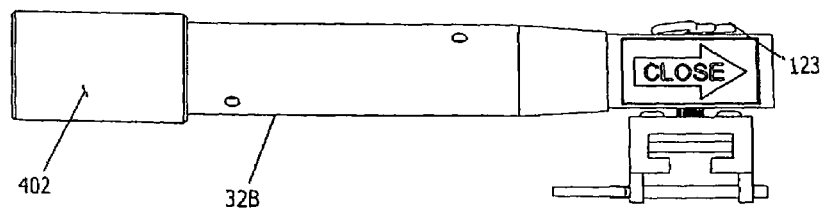
FIG. 60 is a top plan view of the embodiment of FIG. 57.
Figure 61:
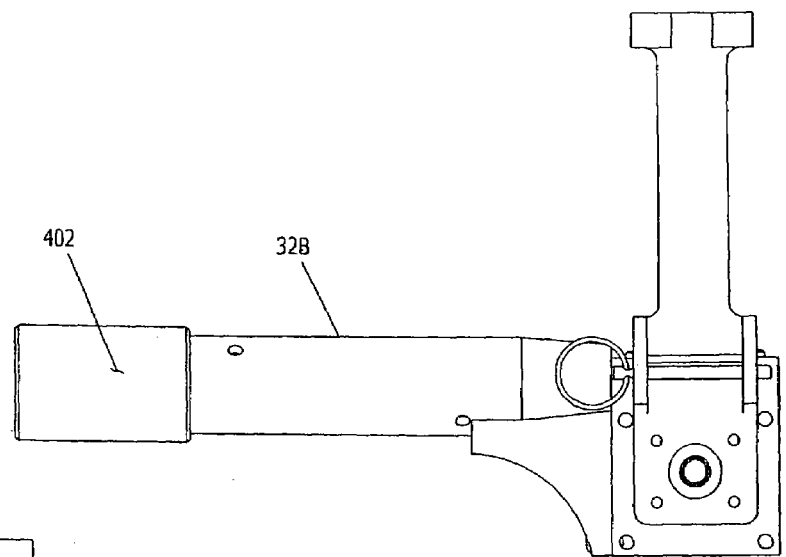
FIG. 61 is a front view of FIG. 60.
Figure 62:
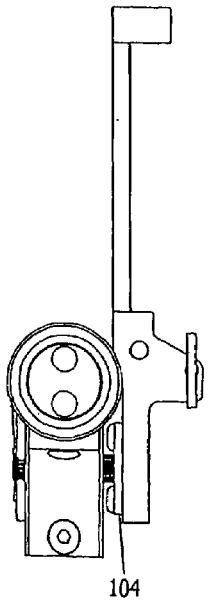
FIG. 62 is a left side view of FIG. 61.

FIGS. 25 and 26 illustrate still another embodiment of valve closure assembly 30A that comprises an air motor 32A, a gearbox 34A, a shoe 36A, and a torque arm 38A. Gearbox 34A is identical to gearbox 34, and air motor 32A is substantially identical to air motor 32, differing in that the ports P1, P2, and P3 via which the motor can be pneumatically operated are incorporated directly in the motor housing to face laterally of the long axis of the motor rather than in a manifold 72 that is fastened to the axial end of the motor housing.

Torque arm 38A is like torque arm 170 in that it can be used with a bi-directional motor both to open a closed valve and close an open valve. It comprises two aluminum brackets 180, 182 and two wheels 184, 186. Each bracket is formed from aluminum sheet to comprise a central mounting zone 188 and arms 190, 192 extending in opposite directions from mounting zone 188. Each mounting zone 188 has a flat rectangular shape for fitting against a respective face 42, 44 of gearbox casing 40 with substantial congruency to side faces 46, 48, 50, 52. A large circular clearance hole 194 is also present in each mounting zone 188 to provide clearance for shoe 36A at face 42 and for retaining clip 123 at face 44.

Each bracket 180, 182 is fastened to casing 40 via four fasteners 196 each of which passes through a respective one of four through-holes 198 arranged in a rectangular pattern in the respective mounting zone 188 to fasten into threaded mounting holes in casing 40.

FIGS. 35, 36, 37, and 38 illustrate detail of bracket 182. At the junction of each of its arms 190, 192 with its central mounting zone 188, bracket 182 is formed with a radius 200 whereby the arms are bent inward out of the plane of mounting zone 188. Further along the length of each arm, there is another radius 202 whereby the far end portion of each arm is disposed in a plane that is essentially parallel with the plane of mounting zone 188. Each far end portion contains a through-hole 204.

Bracket 180 is essentially the mirror image of bracket 182. Consequently when the two brackets are fastened to casing 40, the through-holes 204 in confronting arms 190 mutually align and are spaced apart just enough to allow the respective wheel 184 to fit between them with running clearance. The same is true for through-holes 204 in confronting arms 192 to allow wheel 186 to fit between them.

Each wheel is supported for turning on a respective axle 206 that is fit to through-holes 204 in the corresponding arms.

In addition to extending inwardly from mounting zone 188 toward the opposite bracket arm, each bracket arm also inclines downward. Because each arm joins with the respective mounting zone 188 along approximately the upper half of the zone's height, this provides vertical clearance immediately proximate the lower corners of casing 40 along the entire width of the casing's vertical sides for approximately one-half the height of those sides, with the clearance gradually diminishing in height in the direction away from the casing sides.

Detail of shoe 36A is given in FIGS. 27, 28, 29, and 30. Like shoe 36, shoe 36A is an assembly of several individual parts. One part is the aluminum shoe frame 76A that comprises two rectangular plates 208, 210 arranged in face-to-face contact and a cover 212 covering the opposite face of plate 210. Spline shaft 100 and collar 102 are assembled to plate 208 in the same way as they are to mounting ring 104 in assembly 30 with shaft 100 extending away from the opposite face of plate 210. Plates 208, 210 and cover 212 are held assembled together by a respective fastener 214 at each of the four corners, with plate 210 being sandwiched between plate 208 and cover 212.

Cover 212 has a front wall 216 and two sidewalls 218, 220. The latter run along the shorter sides of front wall 216 and have identical heights and thicknesses thereby endowing frame 76A with a rectangular through-slot 222. Shoe 36A assembles to gearbox 34A as described earlier. Shoe 36A is intended for use with levers that have rectangular cross-sectional shapes of generally uniform width and thickness. For associating shoe 36A to such a lever, one end of slot 222 is aligned with the end of the lever and the shoe is slid onto the lever with the lever passing into slot 222.

FIGS. 31, 32, 33, and 34 show another shoe 36B having a plate 208, a spline shaft 100, and collar 102 like those of shoe 36A. The frame of shoe 36B is a machined part 224 having a rectangular back wall 226, two sidewalls 228, 230, and an end wall 232. Walls 228, 230, 232 extend frontally of back wall 226, bounding the latter along its two sides and one end, leaving the opposite end open. Extending from that opposite end, the free edges of sidewalls 228, 230 have undercuts making the heights (as measured from back wall 226) of the sidewalls shorter along the lengths of the undercuts, a distance approximately one-half the overall lengths of the sidewalls. Beyond the undercuts, sidewalls 228, 230 have heights equal to that of end wall 232 to allow a rectangular cover 234 to be fastened to them by fasteners 236. At the rear face of the frame fasteners 238 fasten plate 208 to the frame behind the undercuts.

Shoe 36B assembles to gearbox 34A as described earlier and is intended for use with certain levers that have rectangular cross-sectional shapes of generally uniform width and thickness. When shoe 36B is associated with such a lever, the distal end of the lever fits into the open space behind cover 234 with the edges of the lever confronting sidewalls 228, 230.

Shoe 36 is also suitable for use with valve closure assembly 30A. By having wheels 184, 186 and the clearance proximate the lower corners of the gearbox, valve closure assembly 30A is rendered suitable for use with various domes whose bottom walls have more dimensional irregularities than those with which valve closure assembly 30 is intended for use. Such irregularities may be due to the presence of various features such as flanges, fasteners, etc. In the illustrated embodiment, the centerline of each axle 206 is 4.5 inches from axis 66, and each wheel 184, 186 has a diameter of 1.6875 inches. This places the bottom of each wheel below axis 66, 0.426 inch above the bottom side 50 of the gearbox casing when side 50 is horizontal placing the axles at the same elevation. The wheels are fabricated from a durable material such as Ampco 21 bronze. Axis 66 is 1.87 inches above side 50.

FIGS. 39–67 illustrate still other embodiments of a valve closure assembly 30B that comprises an air motor 32B and a gearbox 34B. Gearbox 34B is essentially identical to gearboxes 34 and 34A, and air motor 32B is substantially identical to air motors 32 and 32A. The differences between the various embodiments of FIGS. 39–67 resides in the adapters, or shoes, through which the valve closure assemblies 30B associate with a valve handle of a tank car dome valve.

Air motor 32B comprises an output shaft that is coupled to the worm shaft of gearbox 34B in the same manner as in prior embodiments. The air motor is enclosed by a cylindrical-walled cover 70B that has a main cylindrical body 70B1 and a tapered nose 70B2. A member 35B serves to mount the air motor and gearbox to each other. Cover 70B and gearbox casing 40 cooperatively form a housing of the valve operating assembly.

Member 35B comprises a rigid body suitably shaped to hold adjoining parts in a fixed relationship. It comprises two surfaces generally at a right angle to each other. One surface is a cradle 302 that is shaped to receive nose 70B2 and an adjoining portion of main body 70B1; the other is a flat surface 304 that is disposed directly against one of the gearbox casing side faces. Fasteners, such as screws 306, are used to fasten member 35B to cover 70B and gearbox casing 40. At the far ends of cradle 302 and surface 304 are short end faces 308, 310. A concave curved surface 312 having a span of substantially 90° extends between surfaces 308 and 310 as shown. Member 35B has a substantially uniform thickness as measured between flat parallel side faces 314, 316.

Each of the various adapters shown in FIGS. 39–67 has a spline shaft 100. The adapter is assembled to gearbox 34B by inserting the free end of spline shaft 100 through the access opening in the one face of the gearbox casing into the internal gearbox spline 66 to engage the spline shaft with the internal spline. The opposite casing face also has a clearance hole that allows the free end of spline shaft 100 to protrude through. The shaft has sufficient length to expose a circular groove 121 proximate the shaft end. A diagonal through-hole 125 in the shaft at groove 121 allows a retaining clip 123 to be removably attached to the end of the shaft to capture the shaft on the gearbox. The spline shaft can be inserted into the gearbox spline from either casing face thereby providing for the reversible mounting of an adapter on either side of the gearbox.

The embodiment of FIGS. 39–44 comprises an adapter 320. Adapter 320 comprises a rectangular wall 322 having a circular hole at its center. At its four corners, wall 322 is fastened to a rectangular mounting ring 104 affixed to one end of spline shaft 100. A rectangular ledge 324 is supported on one edge of back wall 322, overhanging both faces of wall 322. Rectangular end walls 326, 328 are supported upright along the shorter end edges of ledge 324. A back wall 330 is supported upright along the longer edge of ledge 324 that is toward the gear box. Back wall 330 joins with end walls 326, 328 and extends from ledge 324 somewhat farther than end walls 326, 328.

Each end wall 326, 328 contains a respective circular through-hole 332, 334. These through-holes are aligned along an imaginary axis that is parallel with and spaced from ledge 324 and back wall 330. A hitch pin 336 is passed through holes 332, 334 after the valve closure assembly has been placed on a tank car dome and adapter 320 has been fit to the handle of a valve with which the adapter is intended to be used. When the valve closure assembly is to be removed, hitch pin 336 is extracted from the holes by pulling on a pull ring 338.

Indicia 340 containing the word "close" within the outline of an arrow is provided on the side face of the gearbox casing pointing in the same direction as nose 70B2 of the air motor cover. This indicia indicates the direction in which the valve closure assembly will operate a valve handle to close the associated dome valve.

The embodiment of FIGS. 45–50 comprises an air motor and gearbox like that just described. It has a different shaped mounting ring 104B on spline shaft 100 and a different adapter 350. The adapter comprises a back wall 352 the bottom portion of which is fastened to mounting ring 104B. End walls 354, 356 extend perpendicularly from the longer opposite end edges of back wall 352. Each end wall has a length that begins near the top of the back wall but stops short of the bottom with wall 354 being somewhat longer.

An angle part 358 that comprises walls 360, 362 at a right angle to each other fits to the back and end walls as shown and is fastened to the end walls. This creates a rectangular shaped cavity at the top of the adapter. The cavity is closed except for being open toward the bottom.

The embodiment of FIGS. 51–56 comprises an air motor and gearbox like those in FIGS. 39–44. It has a different adapter 380. The adapter comprises a back wall 382, the bottom portion of which is fastened to mounting ring 104. An end wall 384, a ledge 386, and another end wall 388 are on a face of back wall 382 opposite the gearbox. A lower portion 390 of end wall 384 contains a through-hole, and end wall 388 contains an aligned through-hole providing for a hitch pin 336 to pass through the end walls in spaced relation to back wall 382 and ledge 386 as shown. End wall 384 extends at an angle to provide an inclined surface 392.

The embodiment of FIGS. 57–62 comprises an air motor and gearbox like those in FIGS. 39–44. It has a different adapter 400. The adapter comprises a back wall, the bottom portion 402 of which is fastened to mounting ring 104, and the upper portion 404 of which extends upright from the bottom portion. At the distal end of the back wall is a rectangular-shaped split ring 406 having an open center 408. Split ring 406 is formed by right angle formations 410, 412, as shown. At the junction of back wall portions 402, 404 are two ears 414, 416 that extend perpendicular to the back wall at opposite long edges of the back wall. The ears contain aligned through-holes for a hitch pin 336 to pass through in spaced relation to the back wall as shown.

Each of the valve closure assemblies that has been illustrated and described is used to close what are commonly referred to as ¼-turn ball valves on pressurized, top loading tank cars carrying various hazardous fluids, including the following:
  Jamesbury 2" 5RNT angle ball valves with 3 kinds of handles: standard (closed horizontally pointing toward dome center), GZ (closed horizontally pointing towards the dome wall), or HZ (closed vertically, open horizontally pointing towards the dome wall).
  Jamesbury 2", split flange angle ball valves.
  Jamesbury 2" 5RRR and 5RRU straight through ball valves, with or without a lock out plate pin.
  ACF 2" tank car angle ball UTC (McKenzie) 2" UFRA angle ball valves.

With the proper adapter properly associated with the corresponding valve handle of an open valve, a valve closure assembly will be effective to turn the handle substantially a quarter turn to close the valve in the event of an emergency when air or nitrogen of suitable quality and pressure is delivered to the air motor.

Each of the four different valve adapters 320, 350, 380, and 400 is marked with the particular valves it fits, although the markings are not shown in the drawings. Each adapter can be easily placed on the corresponding valve handle because it is uniquely shaped to fit the handle. Adapters 320, 380, and 400 are placed with their hitch pins removed. Once the adapters have been placed, the hitch pins are replaced to capture the handle. Adapter 350 does not need a hitch pin because the cavity at its far end telescopes onto the free end of the valve handle.

Figure 63:
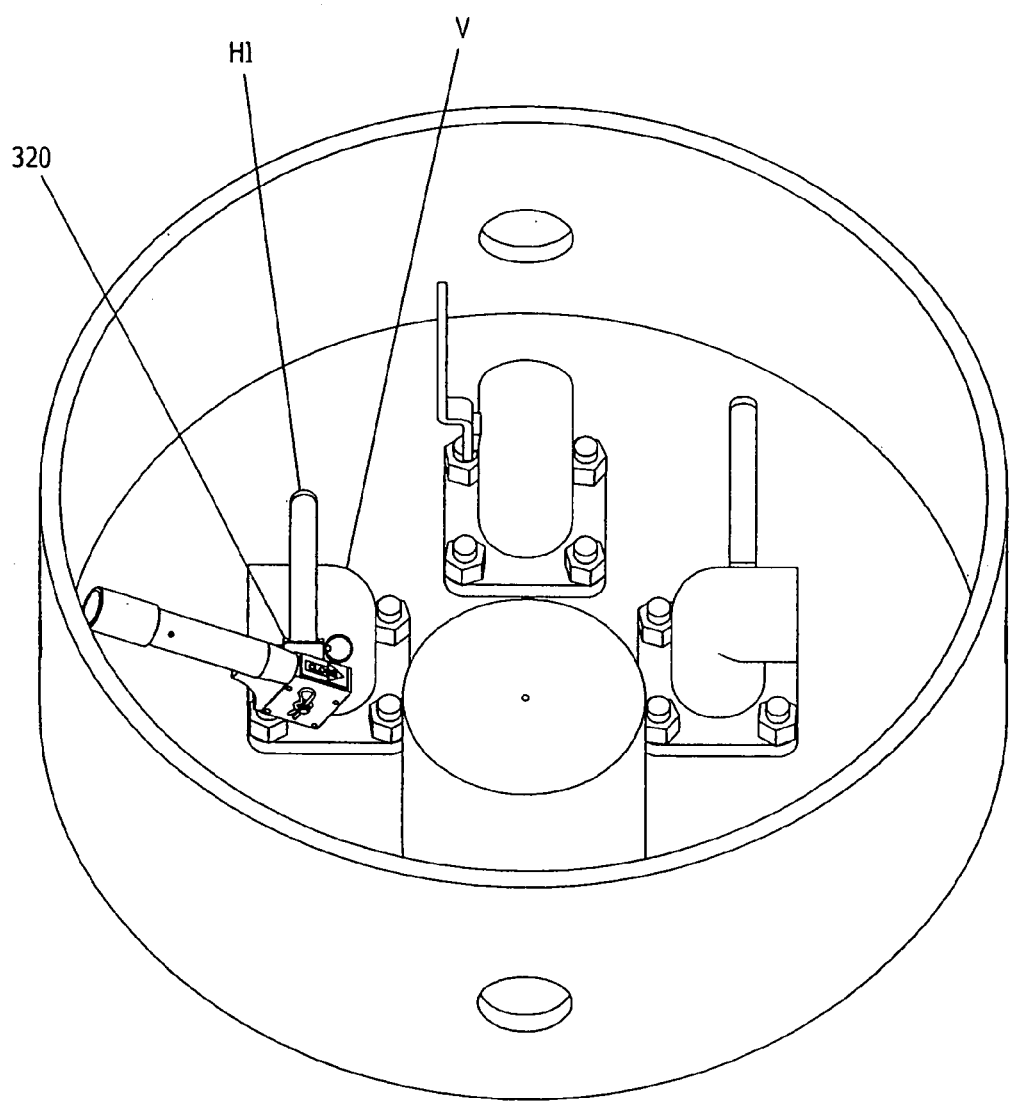
FIG. 63 is a perspective view of a tank car dome showing the embodiment of FIGS. 39–44 in use with one form of valve and handle.
Figure 64:
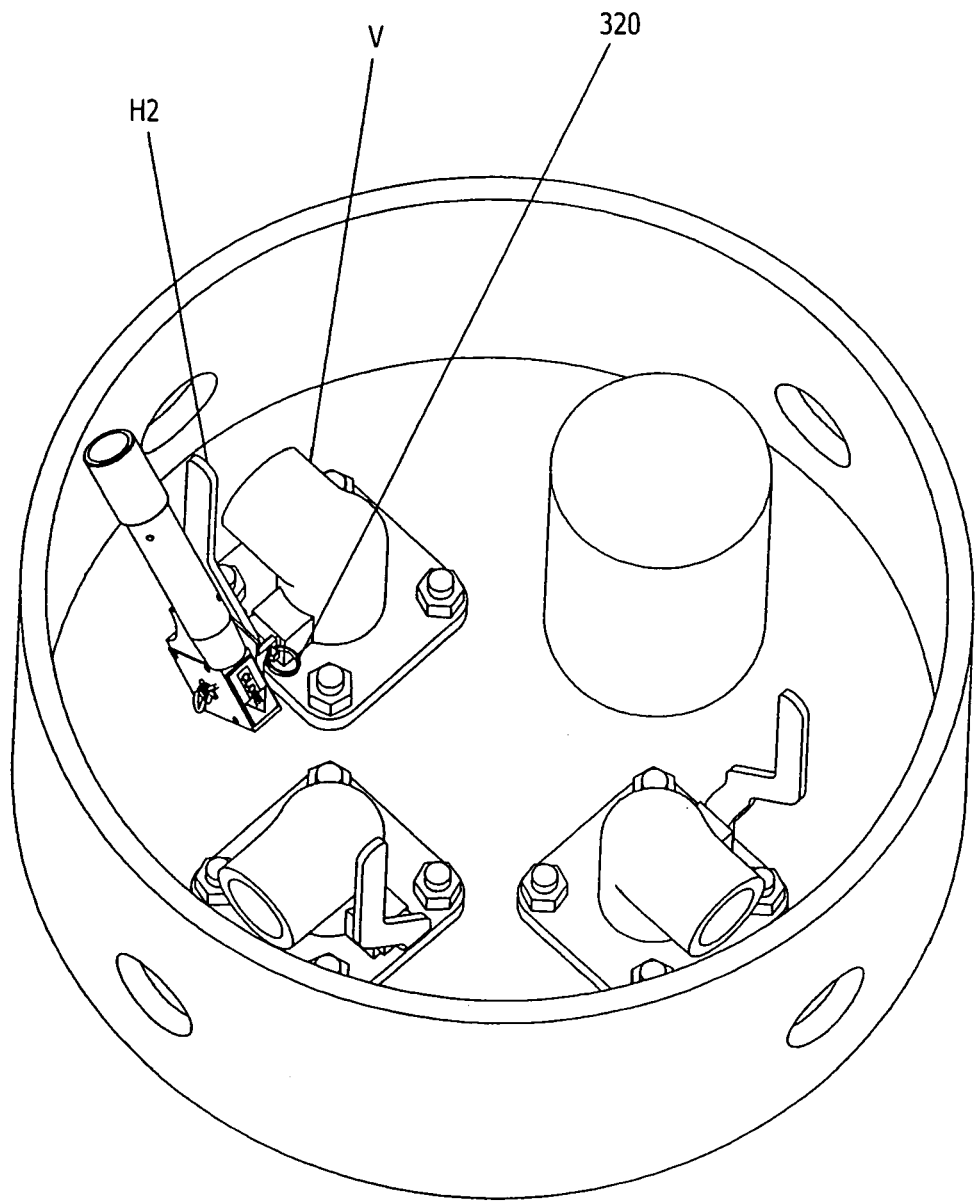
FIG. 64 is a perspective view of a tank car dome showing the embodiment of FIGS. 39–44 in use with another form of valve and handle.
Figure 65:
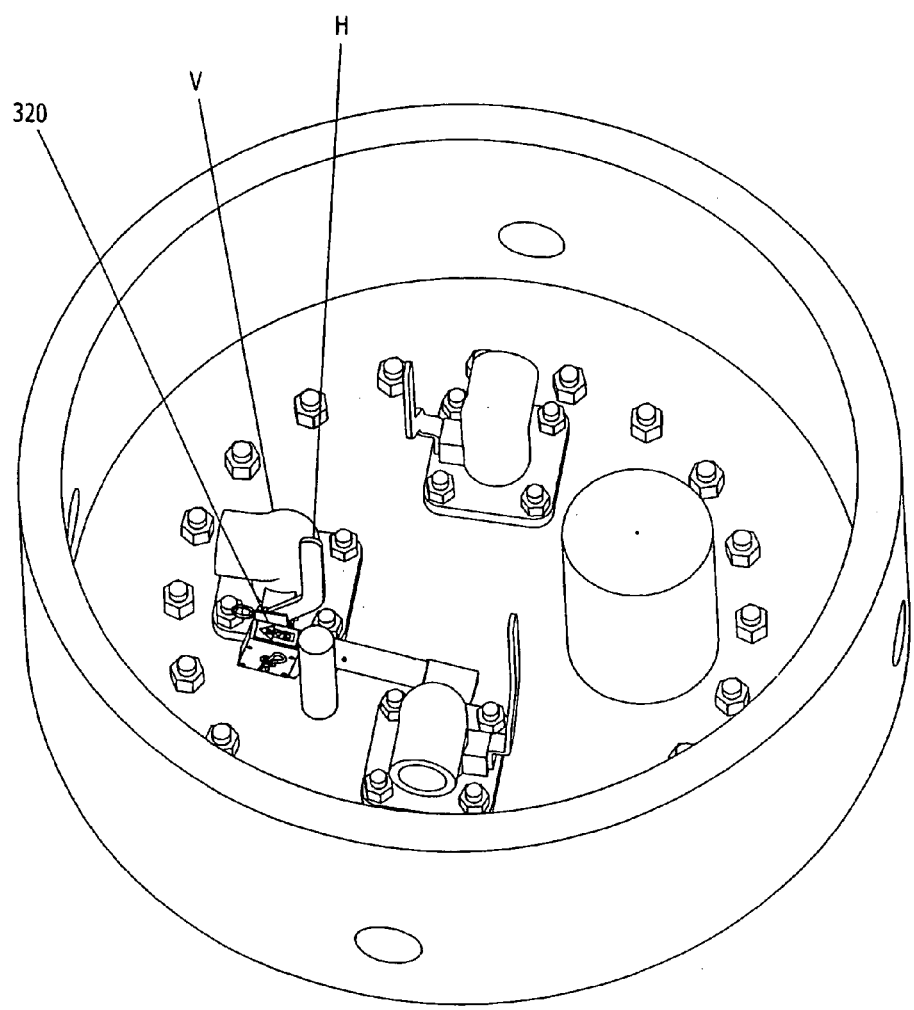
FIG. 65 is a perspective view of a tank car dome showing the embodiment of FIGS. 39–44 in use with still another form of valve and handle.

Adapter 320 is used with the Jamesbury Split Flange valve and the Jamesbury HZ and GZ valve handles, as shown in FIGS. 63, 64, and 65 respectively.

Adapter 350 is used with the handle for the ACF valve.

Figure 67:
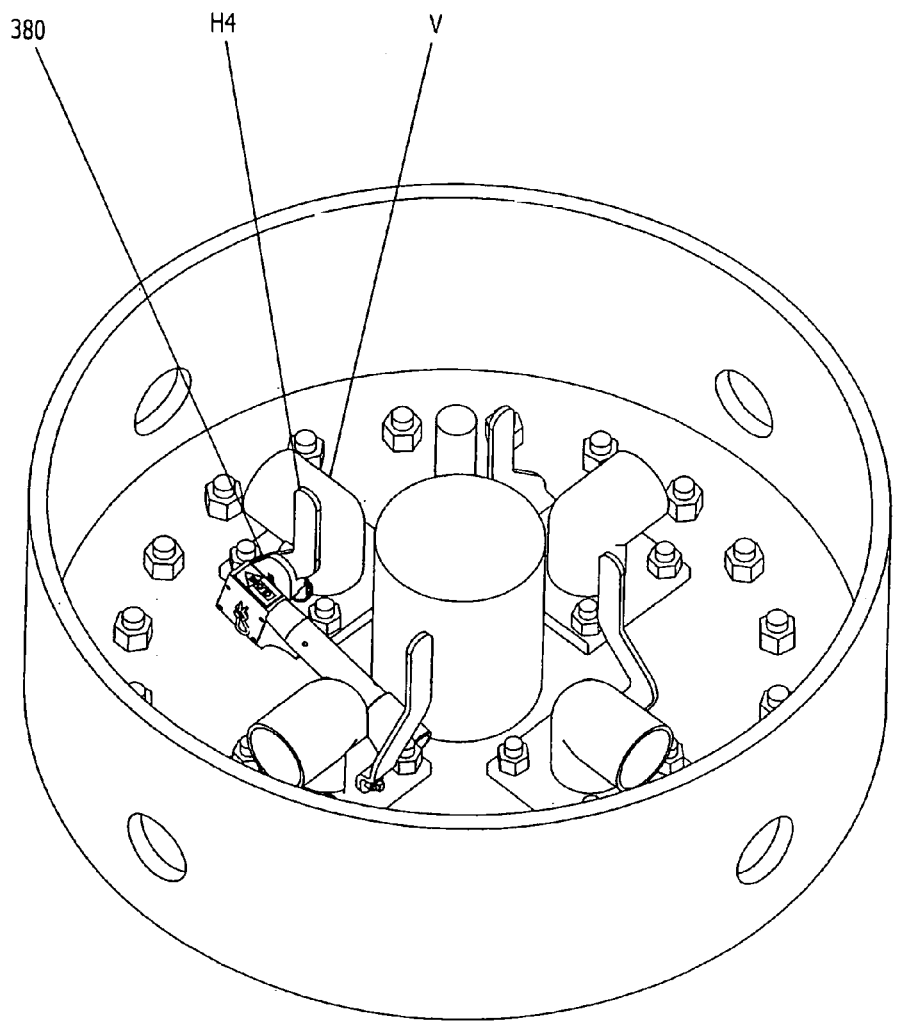
FIG. 67 is a perspective view of a tank car dome showing the embodiment of FIGS. 51–56 in use with still another form of valve and handle.

Adapter 380 is used with the handle for the UTC valve, as shown in FIG. 67.

Figure 66:
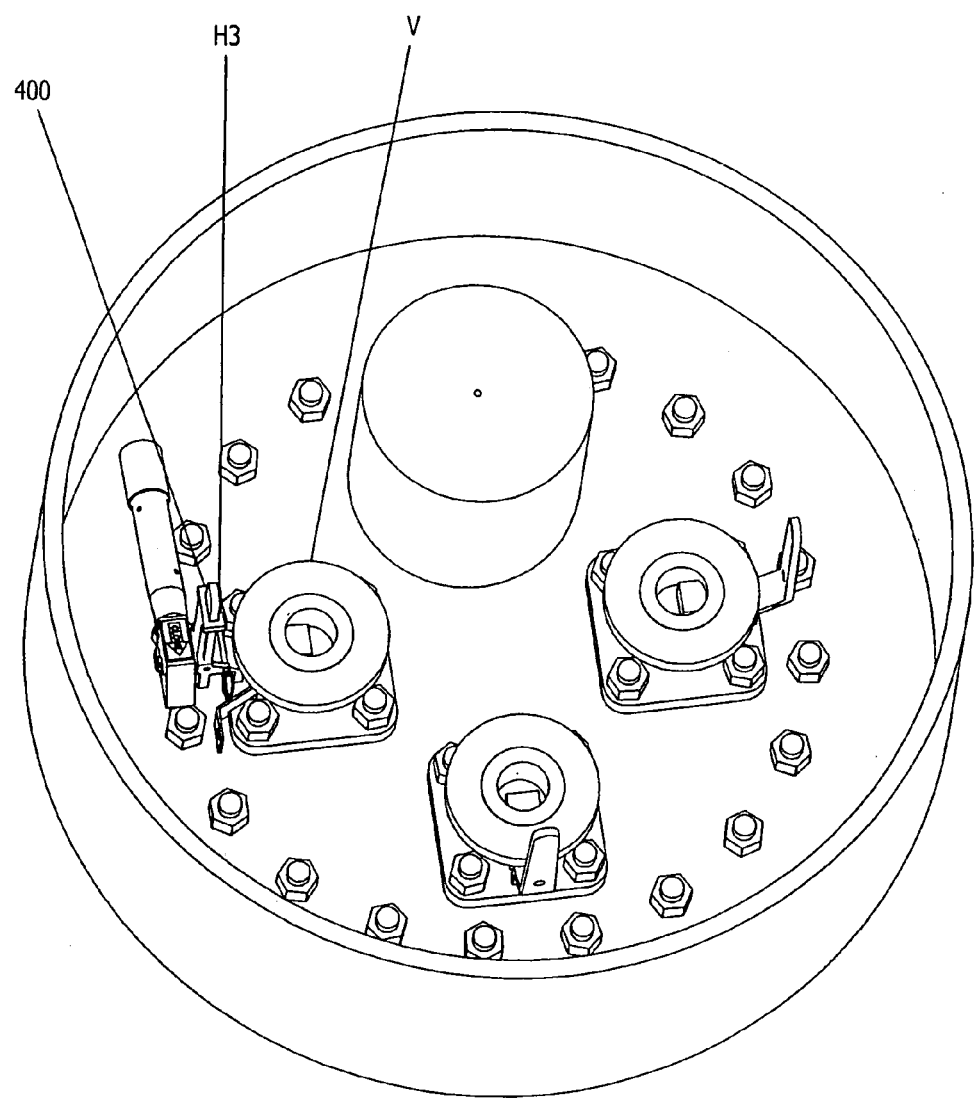
FIG. 66 is a perspective view of a tank car dome showing the embodiment of FIGS. 57–62 in use with still another form of valve and handle.

Adapter 400 is used with the handle for the Jamesbury 5RRR valve, as shown in FIG. 66.

Each FIG. 63–67 shows the valve with which the respective adapter is associated to be in open position. Each adapter comprises a shape that provides for it to be engaged with the valve handle by sliding it onto the valve handle over the free end of the valve handle. Some adapters also include a removable hitch pin for spanning a portion of the valve handle when the adapter is engaged with the valve handle.

When the respective air motor operates, the respective adapter will begin turning relative to the respective gearbox casing. At some point, the gearbox will be constrained against turning because its casing will be forced against either the dome, as in FIGS. 64–67, or against a base of the valve body, as in FIG. 63, preventing further turning, and it is at that point that the adapter will begin turning the valve handle.

A hardened metal ring 402 girdles the far end of motor cover 70B relative to the gear case. When the valve operating assembly is used with certain valve installations, the far end of the motor cover, rather than the gear case, may bear against the dome. In those instances the motor cover functions as a torque arm, with the hardened metal ring bearing against the dome at a distance from the valve.

While a presently preferred embodiment of the invention has been illustrated and described, it should be appreciated that principles of the invention are applicable to all embodiments that fall within the scope of the claims that follow hereinafter.

What is claimed is:

1. An assembly for swinging an external handle of a tank dome valve on a tank dome about a generally horizontal axis, the assembly comprising:
  a housing that encloses a gear that turns on the housing about an axis, a worm meshing with the gear for turning the gear, and a motor that turns the worm to turn the gear, and
  an adapter that is external to the housing and shaped for engagement with the handle of the tank dome valve and that is turned by the gear,
  the housing and adapter being arranged such that, when the adapter is in engagement with the valve handle and the motor is operated to turn the gear relative to the housing, the operation of the motor forces the housing to bear against the tank dome and consequently force the adapter to swing the handle.

2. An assembly as set forth in claim 1 wherein the housing comprises a gear case containing the worm and the gear, and a cover enclosing the motor, and wherein the motor comprises a shaft that extends through an opening in a wall of the gear case to operative coupling with the worm.

3. An assembly as set forth in claim 2 further including a member that joins the motor cover and a wall of the gear case that is at a right angle to an axis about which the motor shaft turns.

4. An assembly as set forth in claim 3 wherein the motor cover comprises a cylindrical wall extending lengthwise away from the gear case parallel to the motor shaft axis.

5. An assembly as set forth in claim 4 including a bearing disposed on the exterior of the motor cover spaced from the gear case for bearing against the tank dome as the motor is operated to force the adapter to swing the handle.

6. An assembly as set forth in claim 5 wherein the bearing comprises a hardened metal ring girdling a far end of the motor cover wall relative to the gear case.

7. An assembly as set forth in claim 1 wherein the gear comprises external teeth with which the worm meshes and an internal spline, the gear case comprises a wall confronting a face of the gear and comprising an aperture aligned with the internal spline, the adapter comprises a shaft having an external spline passing through the aperture and meshing with the internal spline.

8. An assembly as set forth in claim 7 wherein the gear case comprises an opposite wall confronting an opposite face of the gear and comprising an opposite aperture aligned with the internal spine, the adapter shaft has a length that extends completely through the internal spline and through and beyond the opposite aperture, and further including a keeper that is separably associated with the adapter shaft external to the gear case beyond the opposite aperture for preventing the adapter from being separated from the assembly unless the keeper is separated from the adapter shaft.

9. An assembly as set forth in claim 8 wherein the keeper comprises a retaining clip, a portion of which passes through a transverse hole in the adapter shaft.

10. An assembly as set forth in claim 8 wherein the apertures and adapter shaft are sized to allow the adapter to be reversibly mounted on the gear case by separating the adapter from the assembly after the keeper has been separated from the adapter shaft and re-assembling the adapter by inserting the adapter shaft through the opposite aperture to mesh the splines and re-associate the keeper with the adapter shaft.

11. An assembly as set forth in claim 1 wherein the adapter comprises a shape that provides for the adapter to be engaged with the valve handle by sliding the adapter onto the valve handle over a free end of the valve handle.

12. An assembly as set forth in claim 11 wherein the adapter further includes a removable hitch pin for spanning a portion of the valve handle when the adapter is engaged with the valve handle.

13. A method for swinging an external handle of a tank dome valve on a tank dome about a generally horizontal axis, the method comprising:
associating with the handle an adapter that is external to a housing that encloses a gear that turns on the housing about an axis, a worm meshing with the gear for turning the gear, and a motor that turns the worm to turn the gear, and
operating the motor to turn the gear relative to the housing to cause the housing to bear against the tank dome and consequently force the adapter to swing the handle.

14. A method as set forth in claim 13 wherein the housing comprises a gear case containing the worm and the gear, and a cover enclosing the motor, and step of operating the motor to turn the gear relative to the housing to cause the housing to bear against the tank dome and consequently force the adapter to swing the handle comprises causing the gear case to bear against the tank dome.

15. A method as set forth in claim 13 wherein the housing comprises a gear case containing the worm and the gear, and a cover enclosing the motor, and step of operating the motor to turn the gear relative to the housing to cause the housing to bear against the tank dome and consequently force the adapter to swing the handle comprises causing the motor cover to bear against the tank dome.

16. A method as set forth in claim 15 wherein the motor cover comprises a cylindrical wall extending lengthwise away from the gear case parallel to an axis about which the worm turns, and the step of causing the motor cover to bear against the tank dome comprises causing a far end portion of the motor cover wall opposite the gear case to bear against the tank wall.

17. A method as set forth in claim 16 wherein the motor cover includes a bearing member disposed on the far end portion of the cylindrical motor cover wall, and the step of causing a far end portion of the motor cover wall opposite the gear case to bear against the tank wall comprises causing the bearing member to bear against the tank wall.

18. A method as set forth in claim 13 wherein the step of associating the adapter with the handle comprises sliding the adapter onto the valve handle over a free end of the valve handle.

19. A method as set forth in claim 18 wherein the step of associating the adapter with the handle further comprises associating a removable hitch pin with the adapter to aid in retaining the engagement of the adapter with the valve handle after the step of sliding the adapter onto the valve handle.

* * * * *